(12) United States Patent
Xia et al.

(10) Patent No.: US 12,126,460 B2
(45) Date of Patent: Oct. 22, 2024

(54) MULTIFUNCTIONAL DATA REORGANIZATION NETWORK

(71) Applicant: XI'AN JIAOTONG UNIVERSITY, Shaanxi (CN)

(72) Inventors: Tian Xia, Shaanxi (CN); Lingfeng Chen, Shaanxi (CN); Wenzhe Zhao, Shaanxi (CN); Pengchen Zong, Shaanxi (CN); Pengju Ren, Shaanxi (CN); Nanning Zheng, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 323 days.

(21) Appl. No.: 17/685,167

(22) Filed: Mar. 2, 2022

(65) Prior Publication Data
US 2022/0209975 A1 Jun. 30, 2022

Related U.S. Application Data

(63) Continuation of application No. PCT/CN2021/073039, filed on Jan. 21, 2021.

(51) Int. Cl.
*H04L 12/18* (2006.01)
(52) U.S. Cl.
CPC .................. *H04L 12/18* (2013.01)
(58) Field of Classification Search
CPC ....................................... H04L 12/18
See application file for complete search history.

(56) References Cited

U.S. PATENT DOCUMENTS

2015/0310311 A1 10/2015 Shi et al.
2021/0232902 A1* 7/2021 Gupta ............... G06F 15/17306

FOREIGN PATENT DOCUMENTS

CN 102065007 A 5/2011
CN 107590085 A 1/2018

OTHER PUBLICATIONS

International Search Report of PCT/CN2021/073039.
Written Opinion of PCT/CN2021/073039.
Zong. Pengchen et al. "PIT: Processing-in-Transmission With Fine-Grained Data Manipulation Networks" IEEE Transactions on Computers, vol. 70, No. 6, Dec. 30, 2020 (Dec. 30, 2020).
Mahmud, Naveed et al. "Combining Perfect Shuffle and Bitonic Networks for Efficient Quantum Sorting" 2019 IEEE/ ACM International Workshop on Heterogeneous High-performance Reconfigurable Computing (H2RC), Jan. 2, 2020 (Jan. 2, 2020).

* cited by examiner

*Primary Examiner* — Duc C Ho

(57) ABSTRACT

A multifunctional data reorganization network includes a binary switching unit and a recursive shuffle network (RSN), wherein both the binary switching unit and the recursive shuffle network can enable bidirectional transmission of data, and the data reorganization network completes data reorganization by controlling the transmission direction of a signal in the network. The network may serve as a data transfer path between a storage unit and a computation unit to perform multiple data reorganization functions while transferring data, thereby enabling flexible data structure adjustment of non-regular data, and thus improving data transfer efficiency and computational efficiency of non-regular computation.

12 Claims, 27 Drawing Sheets data stream configuration 3 data stream configuration 4

MULTIFUNCTIONAL DATA REORGANIZATION NETWORK

CROSS-REFERENCE TO RELATED APPLICATIONS

This application is a bypass continuation application of PCT application no. PCT/CN2021/073039. This application claims priorities from PCT Application PCT/CN2021/073039, filed Jan. 21, 2021, and from the Chinese patent application 202011585089.4 filed Dec. 28, 2020, the content of which are incorporated herein in the entirety by reference.

FIELD

The present disclosure is in the field of data exchange and electronics technology, and in particular relates to a multifunctional data reorganization network.

BACKGROUND

Current mainstream parallel computing architectures, such as CPU and GPU, provide parallel computing capability in the form of large-scale arrays of computational units. In this architecture, the array of computational units can only perform regular batch data processing, and the transmission path of the data stream between the main memory and the computational units is relatively fixed, resulting in that such compute architectures can support only a limited number of communication and computation modes. However, in many scientific computing and engineering application problems today, the processed data tends not to be simple data structures, but rather organized and stored in the form of matrices, tensors, and even graphs. Such computations, known as non-regular computations, are one of the major challenges faced by current computer technology. In non-regular computational problems, the operation of each data is often no longer a simple numerical operation, but rather different operations need to be completed depending on their attributes in the data structure, such as location, size relative to other data, etc., e.g., dynamically reorganize and map the permutation order of a set of operands onto different computational units. Such non-regular computation requires the architecture to be able to flexibly reassemble and adjust data to adapt to dynamically variable computing patterns. Existing parallel computing architectures lack flexible and efficient data reorganization capabilities, with both data transmission and computation patterns being relatively fixed, and thus suffer from data transmission inefficiency and computational inefficiency when dealing with such non-regular computational problems, resulting in severe performance bottleneck

SUMMARY

In view of this, the present disclosure provides a multifunctional data reorganization network including a binary switching unit and a recursive shuffle network, both of which can enable bidirectional transmission of data, and the data reorganization network completes data reorganization by controlling the transmission direction of a signal in the network.

By the above solution, a multifunctional data reorganization network is implemented based on binary non-blocking switching network technology, by employing multifunctional binary switching units and data stream control, reorganization can be realized during data transmission. This approach is important for solving the major performance bottleneck of non-regular computing as a modern computer technology.

BRIEF DESCRIPTION OF THE DRAWINGS

FIG. 5 (b) is a circuit block diagram of a look-up table based base switching unit provided in one embodiment of the present disclosure;

FIG. 6 (b) is a circuit block diagram of a lookup table-based reduction switching unit provided in one embodiment of the present disclosure;

FIG. 8 (b) is a schematic diagram of another recursive shuffle network on a k=2n scale provided in one embodiment of the present disclosure;

FIG. 9 (b) is a schematic diagram of topology of another SOM transport network provided in one embodiment of the present disclosure;

FIG. 17 (b) is a non-zero numeric decompression and control signal configuration diagram of the SOM transport network provided in one embodiment of the present disclosure;

FIG. 22 (b) is a schematic diagram of an embedded adder tree formed by respective reduction switching units in the SOM reduction network provided in one embodiment of the present disclosure;

DETAILED DESCRIPTION OF THE EMBODIMENTS

The present disclosure is described in further detail below with reference to FIGS. 1 to 25.

In one embodiment, a multifunctional data reorganization network is disclosed, the network includes a binary switching unit and a recursive shuffle network (RSN), wherein both the binary switching unit and recursive shuffle network can enable bidirectional transmission of data, and the data reorganization network completes data reorganization by controlling the transmission direction of a signal in the network.

Figure 1:
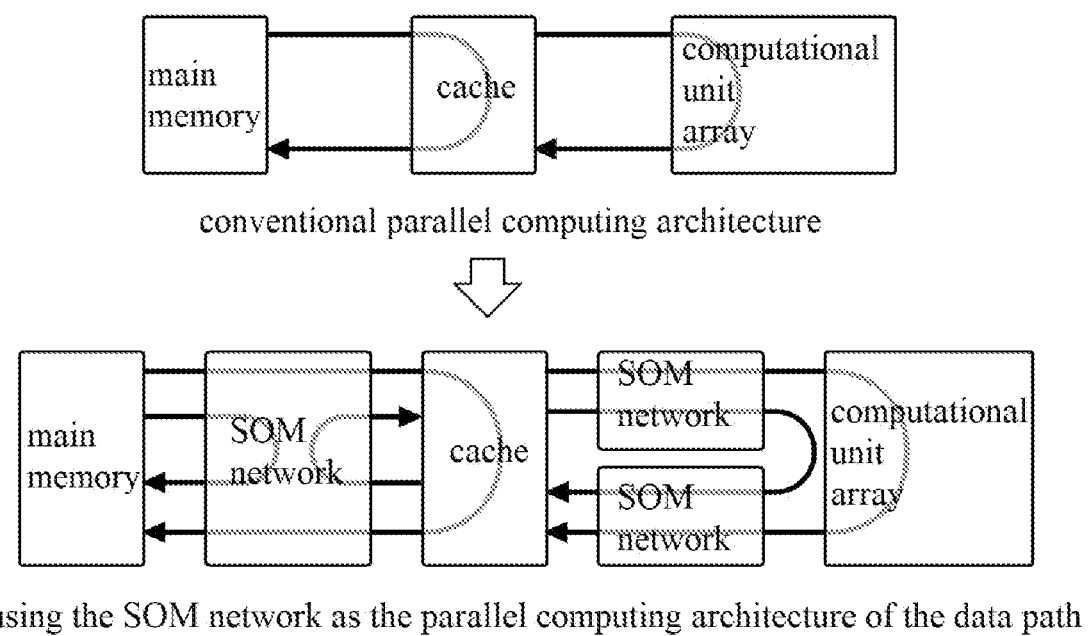
FIG. 1 is a schematic diagram of a conventional parallel computing architecture and a novel parallel computing architecture based on SOM provided in one embodiment of the present disclosure.

In terms of this embodiment, referring to FIG. 1, the data reorganization network, namely, SOM (Sort Recorder Multicast) may act as a data transfer path between a storage unit and a computational unit, various data reorganization functions are executed at the same of data transmission, so that flexible data structure adjustment of non-regular data can be made to efficiently adapt to the current mainstream storage devices (e.g., caches, vector registers) and regular computational unit arrays. The SOM networks are generally used herein to refer broadly to SOM transport networks and SOM reduction networks. The binary switching unit and RSN are fundamental components of the SOM network, both of which have the property of bidirectional transmission. Bidirectional transmission is one of the core characteristics of the present solution. By controlling the direction of transmission of signals in the network, different logical topologies can be implemented with the same network hardware connections, thereby accomplishing different data reorganization functions. This greatly expands the flexibility and adaptability of the SOM network.

In another embodiment, the binary switching unit includes a basic switching unit and a reduction switching unit.

Figure 2:
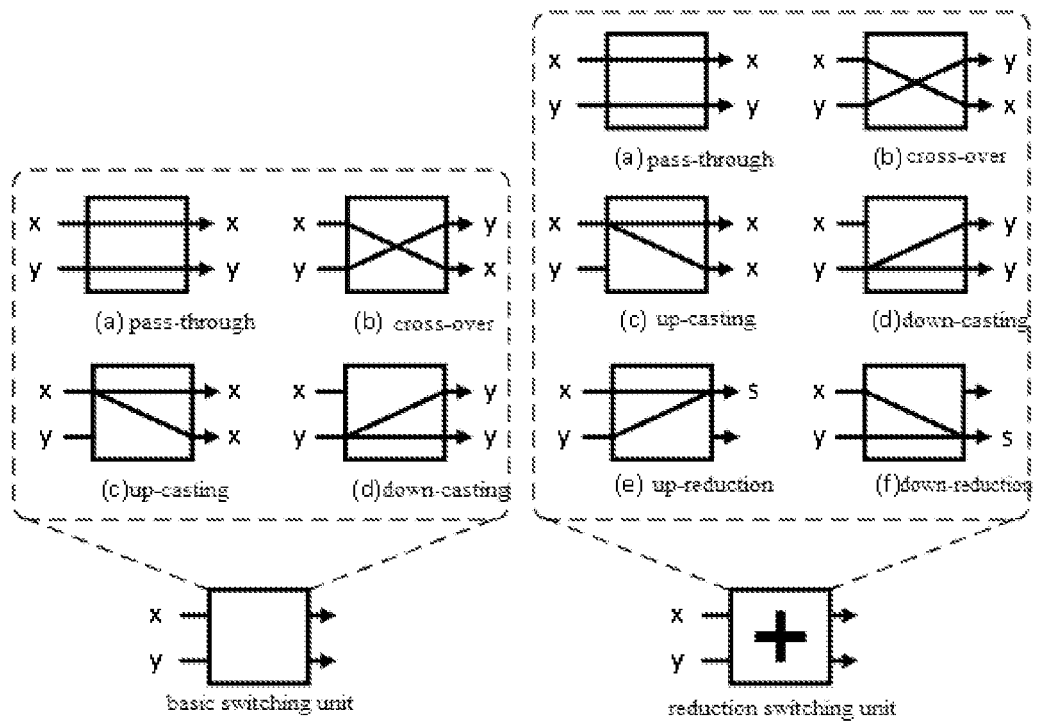
FIG. 2 is a routing function of a basic switching unit and a reduction switching unit provided in one embodiment of the present disclosure.

In terms of this embodiment, the SOM network is constructed based on binary non-blocking switching network technology, whose basic functional modules are multifunctional binary switching units. Each switching unit has two input ports and two output ports. The switching unit may route the two input signals onto the two output ports in different ways. As shown in FIG. 2, a SOM network includes two types of switching units in total: a basic switching unit and a reduction switching unit. The basic switching unit may support the following routing approaches: pass-through, cross-over, up-casting, and down-casting, wherein "pass-through" means sending a value of a first input signal to a first output port and sending a value of a second input signal to a second output port; "cross-over" means sending the value of the first input signal to the second output port and sending the value of the second input signal to the first output port; "up-casting" means copying a numerical value of a first input signal onto two output ports, and "down-casting" means copying a numerical value of a second input signal onto two output ports. In addition to having all of the routing functions of the basic switching unit, the reduction switching unit has two additional routing functions: up-reduction and down-reduction. "Up-reduction" means that two input signals are added and output from the first output port and "down-reduction" means that two input signals are added and output from the second output port.

In another embodiment, the input signal of the binary switching unit includes a tag and a data payload, wherein the data payload is the data content actually needed to be transferred, and the tag is the corresponding routing information.

In another embodiment, the binary switching unit has two modes of operation: a self-routing mode and routing fulfilled by following routing information input externally, wherein the self-routing mode is that the routing method is determined according to the value of the tag or the data payload of the input signal.

Figures 3A, 3B:
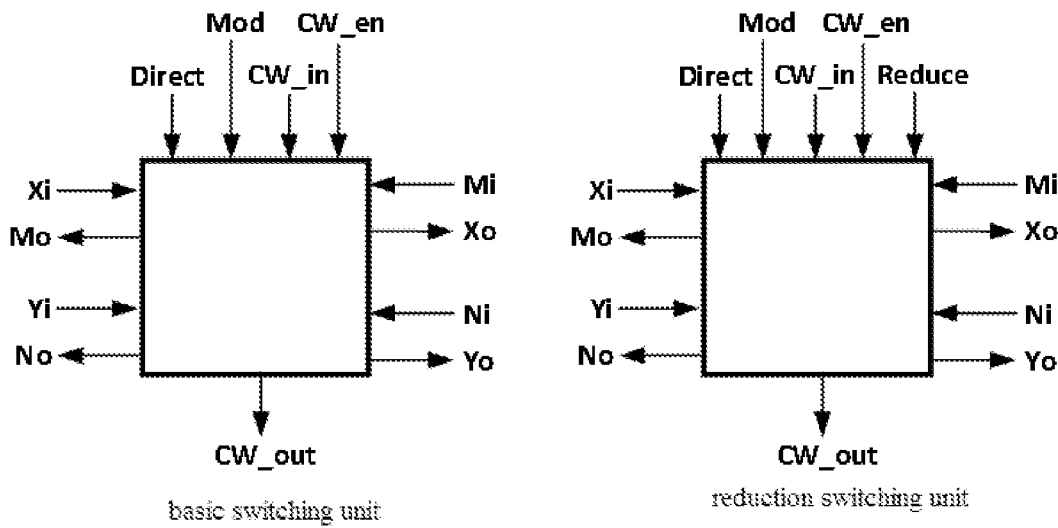
FIGS. 3 (a), 3 (b) are interface signals of the basic switching unit and the reduction switching unit provided in one embodiment of the present disclosure.

In terms of this embodiment, FIGS. 3 (a) and 3 (b) represent block diagrams of two types of binary switching units and input and output signals. It can be seen that the binary switching unit contains two sets of input and output ports that can accomplish bidirectional data transmission, namely: from the left input port (Xi, Yi) to the right output port (Xo, Yo), and from the right input port (Mi, Ni) to the left output port (Mo, No). By configuring the Direct signal, the current transmission direction can be selected. The CW_in signal is routing information from an external input and is used to direct the routing behavior of the switching unit. Correspondingly, the CW_out signal is used to output the current routing behavior of the switching unit at each clock cycle. The Mod signal is used to control the specific operating mode of the switching unit. In addition to this, the reduction switching unit also has a Reduce signal to indicate whether to adopt the reduced routing method.

Figure 4:
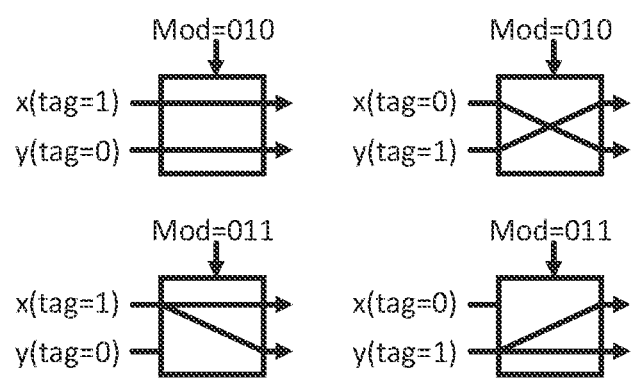
FIG. 4 is an exemplary diagram of switching unit self-routing provided in one embodiment of the present disclosure.

The specific meaning of the individual signals of the binary switching unit is listed in Table 1. Both the input signal and the output signal contain two parts: the tag and the data payload. The bit width of both can be adjusted according to the actual application scenario. The bit width of the tag may generally be set to $\log_2 k+1$, k being the number of whole network input signals. The bit width of the data payload may be adjusted depending on the type of data being transferred, and typical data types include a 8-bit fixed-point number, a 32-bit fixed-point number, a 32-bit single precision floating point number, and the like. When the CW_en signal is 1, the binary switching unit selects the routing method using the signal of the CW_in input. When the CW_en signal is 0, the binary switching unit operates in a self-routing mode, performs routing calculations according to the configuration of the Mod signal, and selects a routing method according to the calculation results. For example, when the Mod signal is set to 010, the binary switching unit compares the tag values of the two input signals and sends the input signal with the larger tag value to the first output port and the input signal with the smaller tag value to the second output port. Thus, if the tag value of the first input port is greater than the tag value of the second input port, the binary switching unit selects a pass-through route; conversely, a "cross-over" route is selected. FIG. 4 lists examples of self-routing methods under several different Mod settings. It should be noted that when the Mod signal is set to 000, the s_id bit signal of the input signal tag needs to be used, with s_id representing the switching unit level of the current binary switching unit.

TABLE 1

| Signal | Direction | Bit width (bit) | Function |
|---|---|---|---|
| Xi/Yi/Mi/Ni | Input | Tag Payload | Input signals in two directions, including input tags and input data payloads |
| Xo/Yo/Mo/No | Output | Tag Payload | Output signals in two directions, including output tags and output data payloads |
| Direct | Input | 1 | Indicating transmission direction: 0: from a left input port (Xi, Yi) to a right output port (Xo, Yo) 1: from a right input port (Mi, Ni) to a left output port (Mo, No) |
| CW_en | Input | 1 | Indicating whether an external routing signal is used: 0: No external routing signal is used, the switching unit routes according to the routing method configured by the Mod signal 1: The external routing signal is used, the switching unit ignores the configuration of the Mod signal, and directly uses a CW_in signal for routing |
| CW_in | Input | 2 | Indicating the route mode: 01: pass-through; 10: cross-over; 00: up-casting; 11: down-casting |
| CW_out | Output | 2 | Output the routing mode: 01: pass-through; 10: cross-over; 00: up-casting; 11: down-casting |
| Mod | Input | 3 | Self-routing mode: 10: Compare the tag values of the input signals and send the larger tag and its corresponding data to the first output port and the smaller to the second output port 001: Compare the tag values of the input signals and send the larger tag and its corresponding data to the second output port and the smaller to the first output port 11: Compare the tag values of the input signals and send the larger tag and its corresponding data simultaneously to the first and second output ports 000: Send an input signal with the Tag highest bit being 1 and Tag [s_id] being 0 to the first output port, and an input signal with the Tag highest bit being 1 and Tag [s_id] being 1 to the second output port, wherein s_id is a number inherent to each switching unit to indicate at which level of the overall network it is. 110: Compare the data payload values of the input signals and send the larger data payload and its corresponding tag to the first output port and the smaller to the second output port 101: Compare the data payload values of the input signals and send the larger data payload and its corresponding tag to the second output port and the smaller to the first output port |
| Reduce | Input | 1 | Indicating whether reduced routing is used: 0: Reduced routing is not used; 1: Reduced routing is used If reduced routing is used, the CW_in signal needs to be configured simultaneously to complete up-reduction and down-reduction: |

TABLE 1-continued

| Signal | Direction | Bit width (bit) | Function |
|---|---|---|---|
| | | | {Reduce, CW_in} = 001: up-reduction, the sum of the data payloads of the two input signals is sent to the first output port<br>{Reduce, CW_in} = 010: down-reduction, the sum of the data payload of the two input signals is sent to the second output port |

Figure 5A:
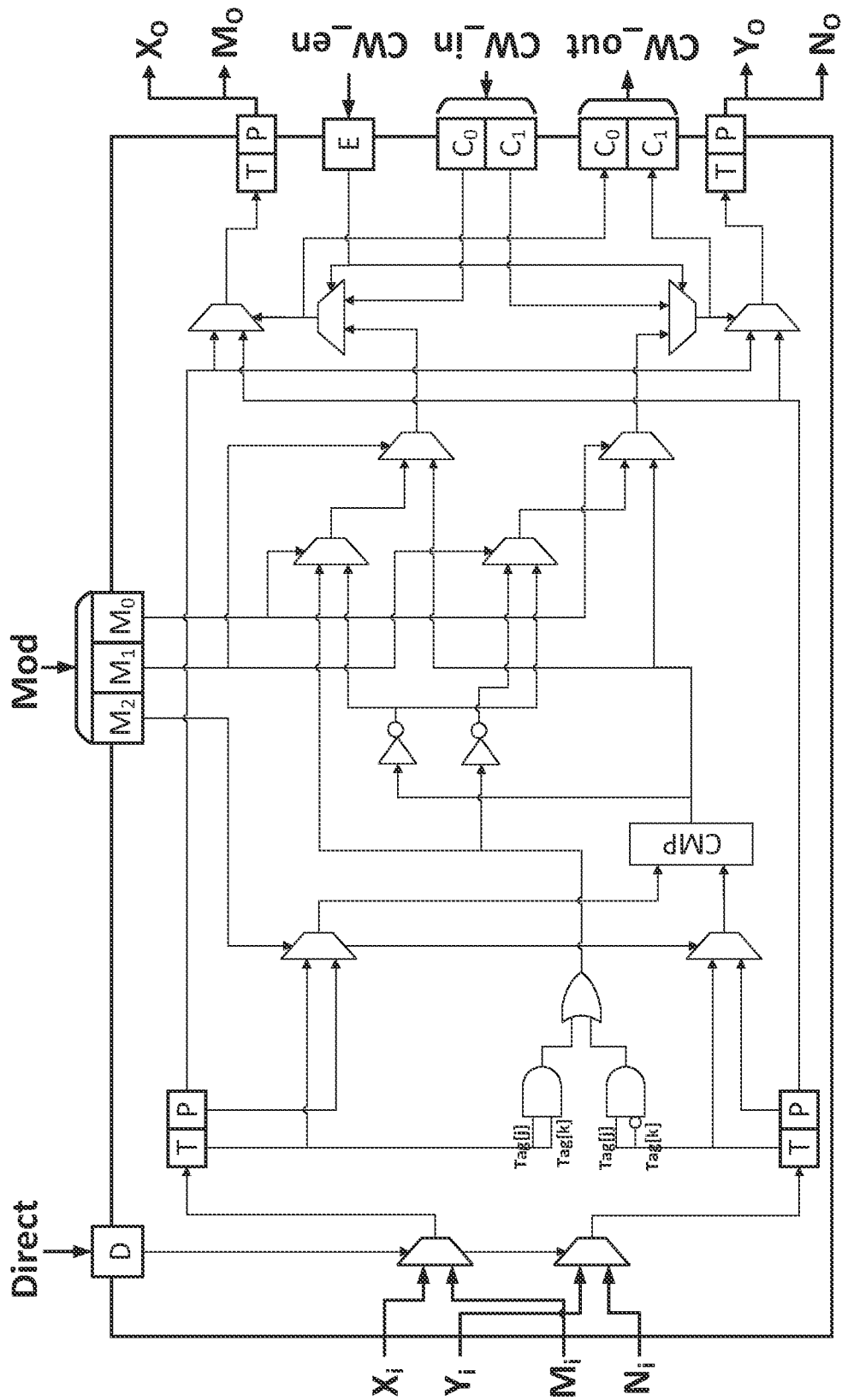
FIG. 5 (a) is a circuit block diagram of a selector-based base switching unit provided in one embodiment of the present disclosure.
Figure 5B:
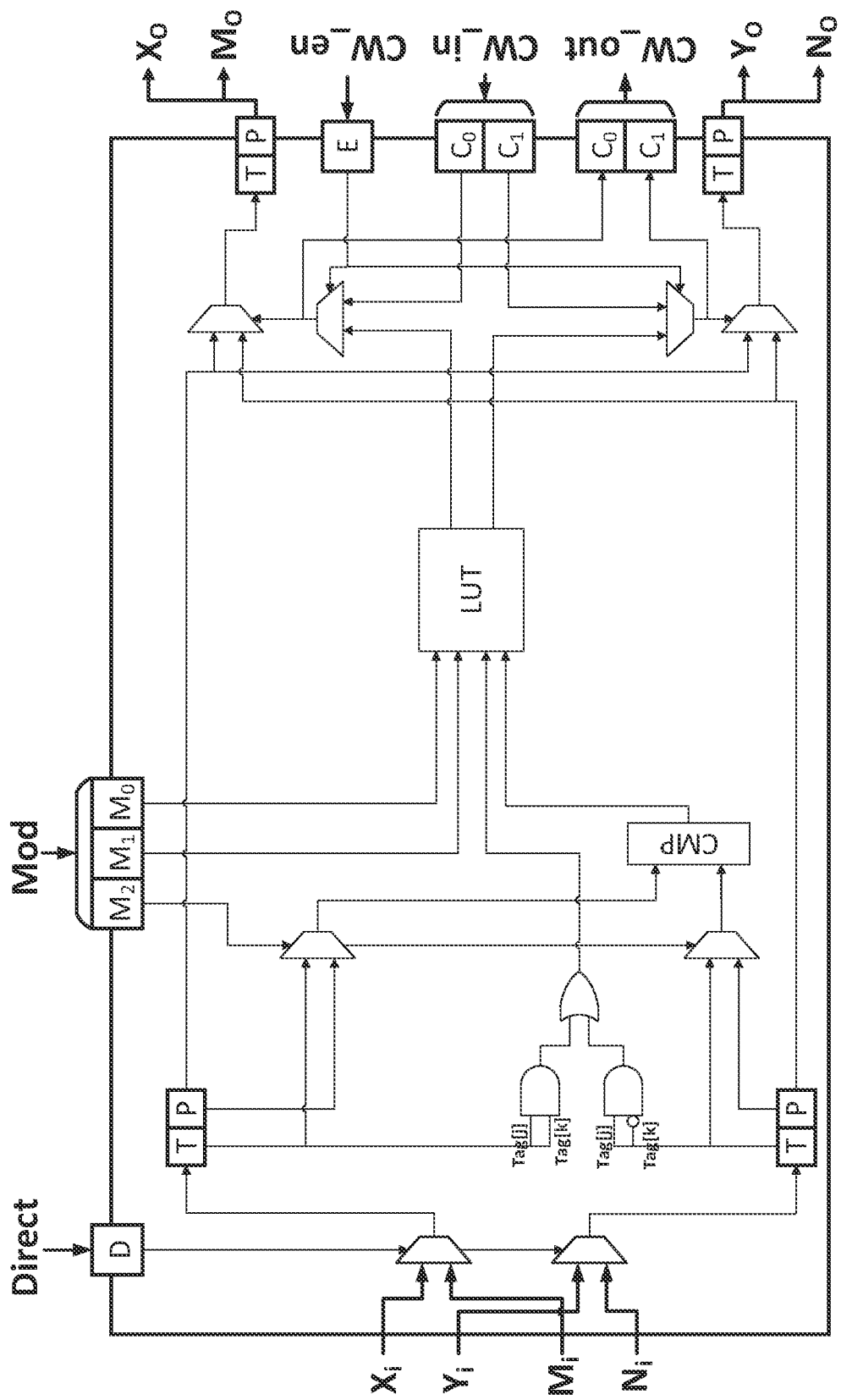
Figure 6A:
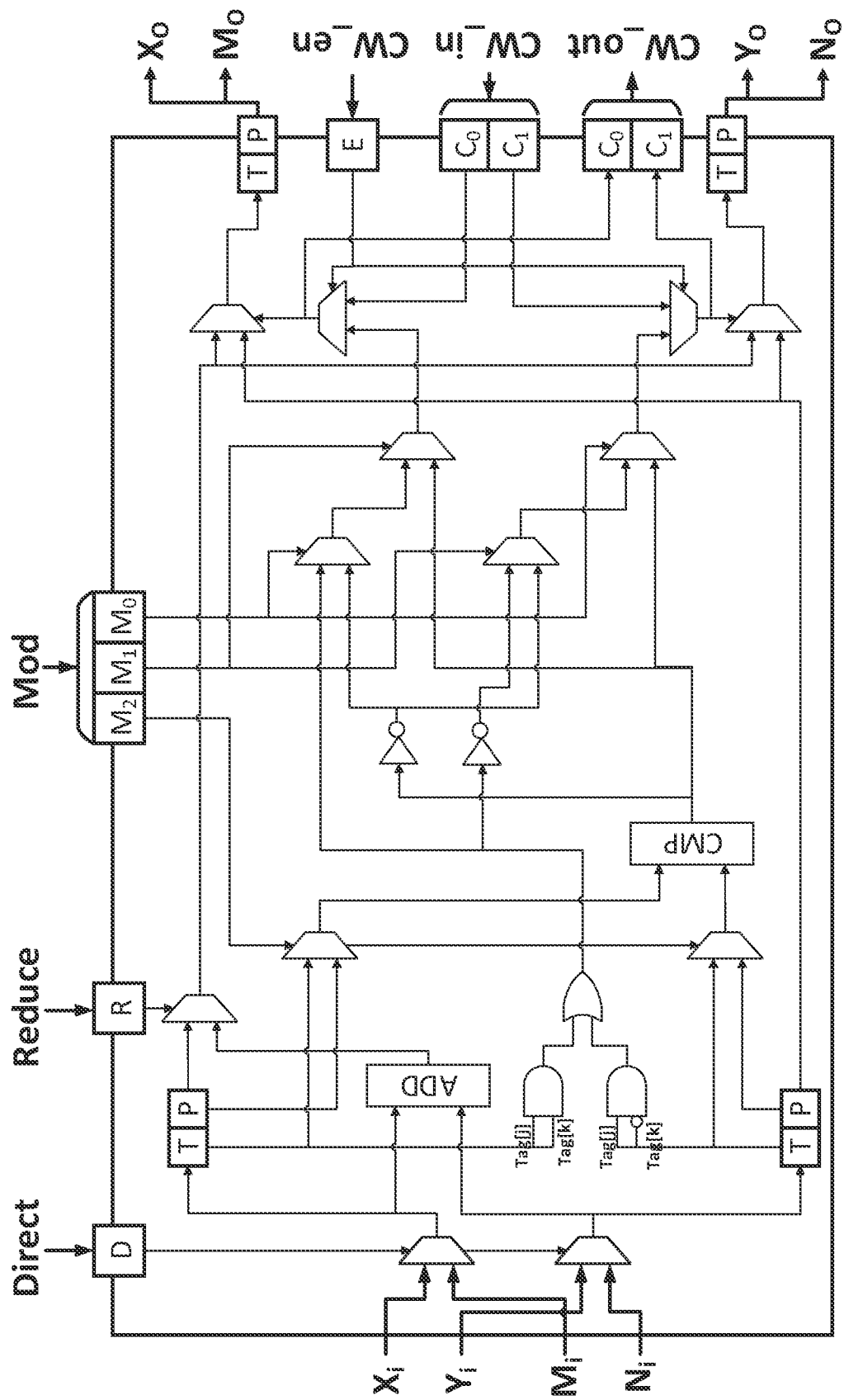
FIG. 6 (a) is a circuit block diagram of a selector-based reduction switching unit provided in one embodiment of the present disclosure.
Figure 6B:
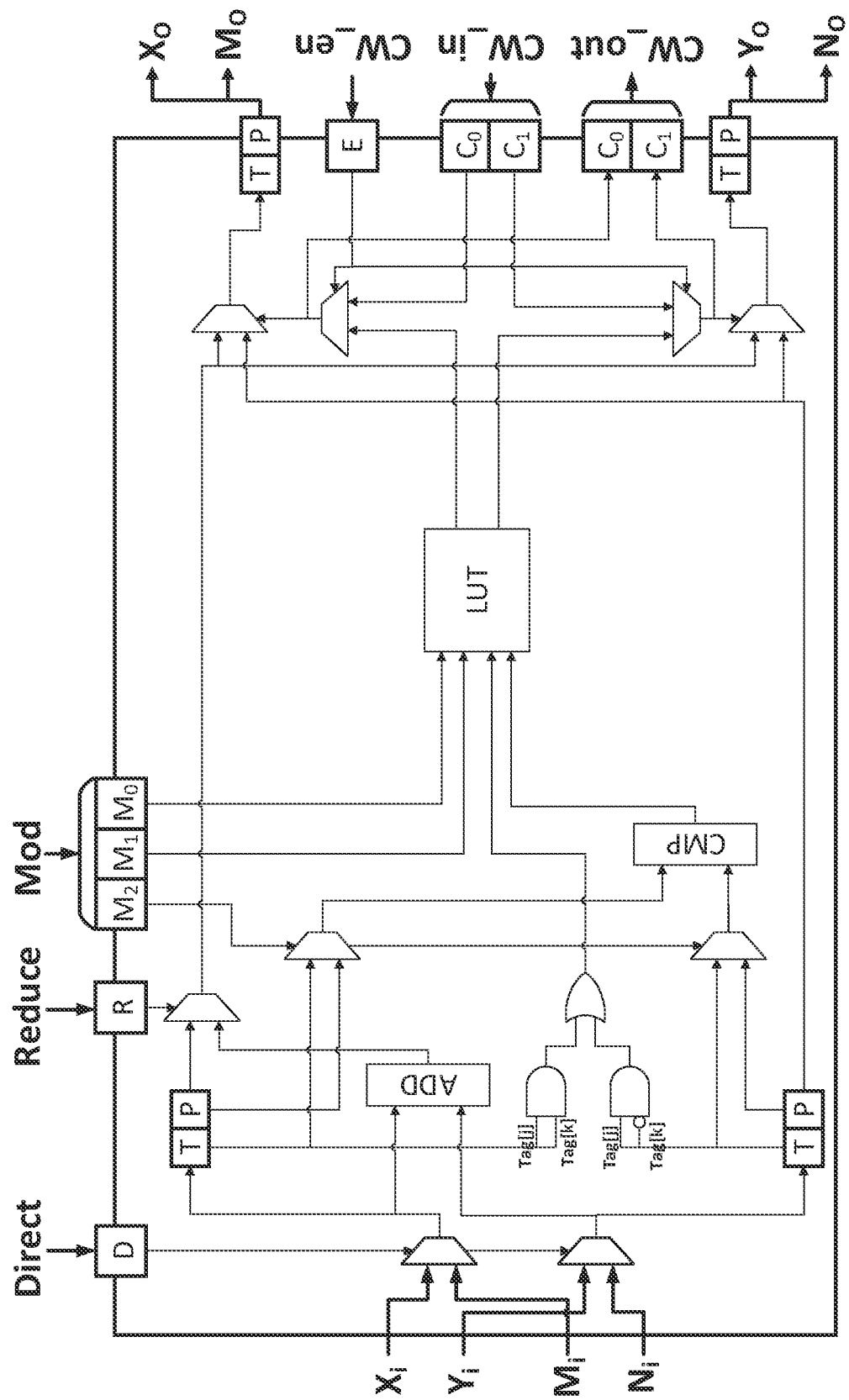

FIG. 5 (a), FIG. 5 (b) and FIG. 6 (a), FIG. 6 (b) present two possible implementation methods for the basic switching unit and the reduction switching unit, respectively: a selector-based implementation and a Look-up Table (LUT)-based implementation. The signals Tag [j] and Tag [k] refer to the 1 bit data of the highest bit of the input signal tag, and the 1 bit data of the s_id corresponding bit, respectively. A comparator is included in both the basic switching unit and the reduction switching unit to compare the values of the tags or data payloads of the two inputs to output 0 when the first value is greater than or equal to the second value and 1 otherwise. The reduction switching unit includes, in addition to the comparator, an adder for calculating the sum of the data payload values of the two inputs. The output bit width of the adder is equal to the bit width of the data payload. If the summed result overflows, the summed result is truncated so that it fits the bit width of the data payload.

In another embodiment, the recursive shuffle network RSN is obtained by successively superimposing a smaller-scale bidirectional perfect shuffle network.

Figure 7:
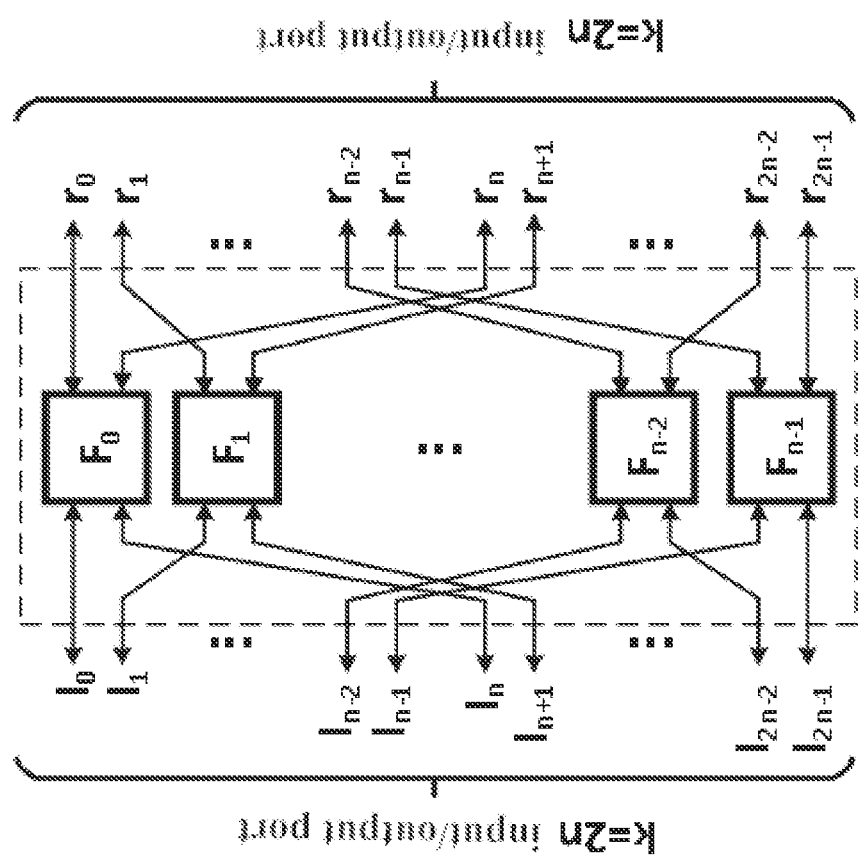
FIG. 7 is a schematic diagram of a bi-directional perfect shuffle network on a k=2n scale provided in one embodiment of the present disclosure.

In terms of this embodiment, a plurality of binary switching units constitute a Recursive Shuffle Network (RSN) by way of a hierarchical recursive topology. The topology of the RSN is recursive, with its basic topology in the form of "Perfect Shuffle". As shown in FIG. 7, for a perfect shuffle network of scale k=2n, n is any positive integer and k is a positive integer power of 2, i.e., k=$2^r$, n=$2^{r-1}$, and r is a positive integer greater than 1. In practical use, k typically ranges from 4 to 512 and n typically ranges from 2 to 256. Its left has k input ports ($l_0$-$l_{2n-1}$), right has k output ports ($r_0$-$r_{2-1}$), n binary switching units ($F_0$-$F_{n-1}$), wherein the 0-(n-1) th input port is sequentially connected to the first input port of each binary switching unit and the n-(2n-1) th input port is sequentially connected to the second input port of each binary switching unit. Similarly, the 0-(n-1) th output port is sequentially connected to the first output port of each binary switching unit, and the n-(2n-1) th output port is sequentially connected to the second output port of each binary switching unit. Since each binary switching unit can complete bidirectional transmission, it constitutes a bidirectional perfect shuffle network.

Figure 8A:
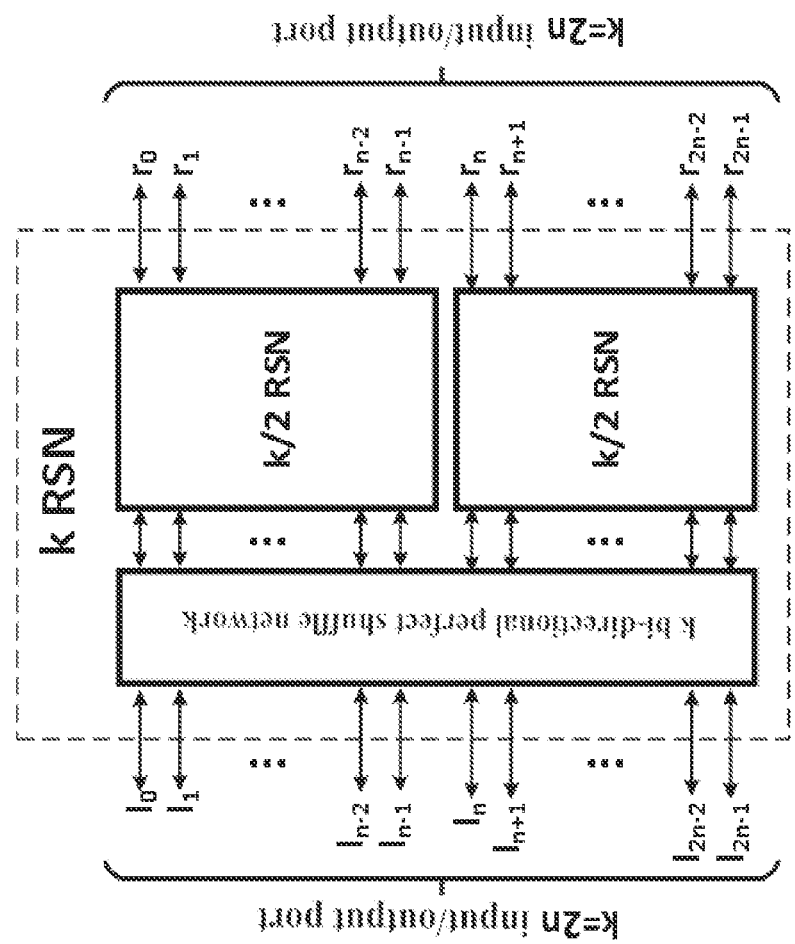
FIG. 8 (a) is a schematic diagram of a recursive shuffle network on a k=2n scale provided in one embodiment of the present disclosure.
Figure 8B:
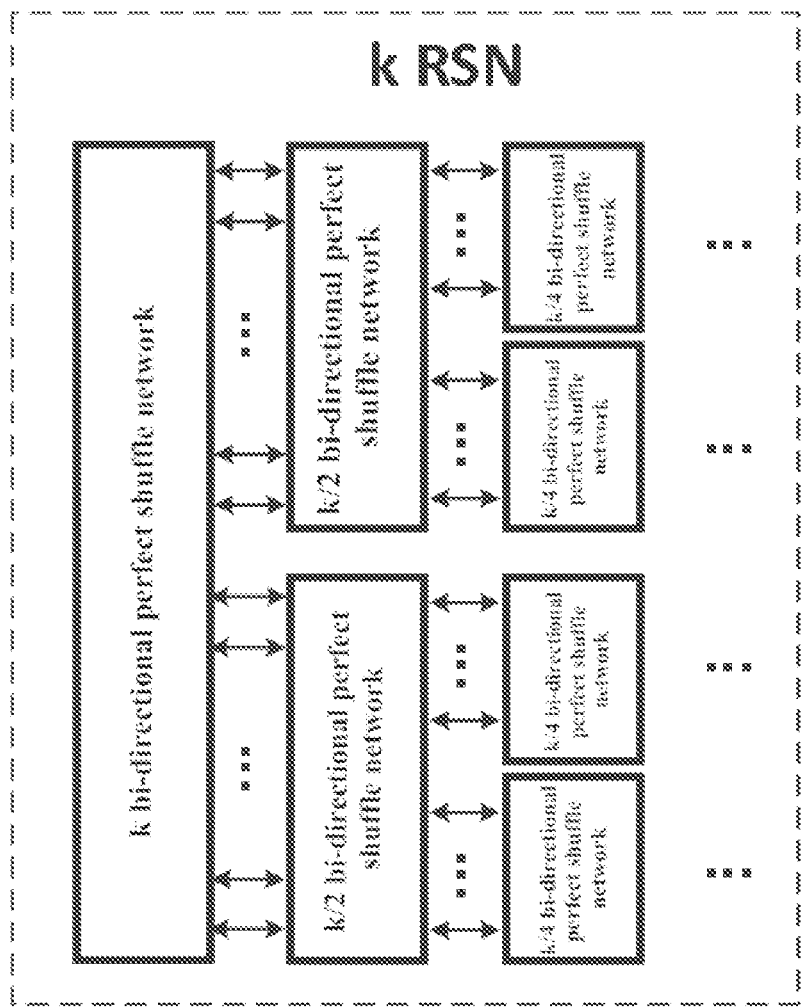

An RSN of k=2n scale may be constructed by cascading a bidirectional perfect shuffle network of k=2n scale and two parallel RSNs of k=n scale as shown in FIG. 8 (a). This recursively built RSN is in fact constructed by connecting smaller scale bidirectional perfect shuffle networks in stages after the bidirectional perfect shuffle network. As shown in FIG. 8 (b), it is demonstrated that an RSN of scale k=2n can be obtained by successively superimposing bidirectional perfect shuffle networks of scale (k, k/2, k/4, . . . , 2. It should be noted that for an RSN of scale 2, its composition is the bidirectional perfect shuffle network itself. The scale size k of RSN is always a power of 2, so there is always k=$2^r$. As can be seen from the topology of FIG. 8 (b), for an RSN of scale k=2n=$2^r$, all the bidirectional perfect shuffle networks at the same recursion level are actually composed of n binary switching units that are independent and parallel to each other, referred to as stages. The entire RSN topology contains r-stage binary switching units in total.

In another embodiment, a SOM transport network is built up recursively based on RSNs, with all RSN networks in each recursion level being treated as a whole functional Block.

Figure 9A:
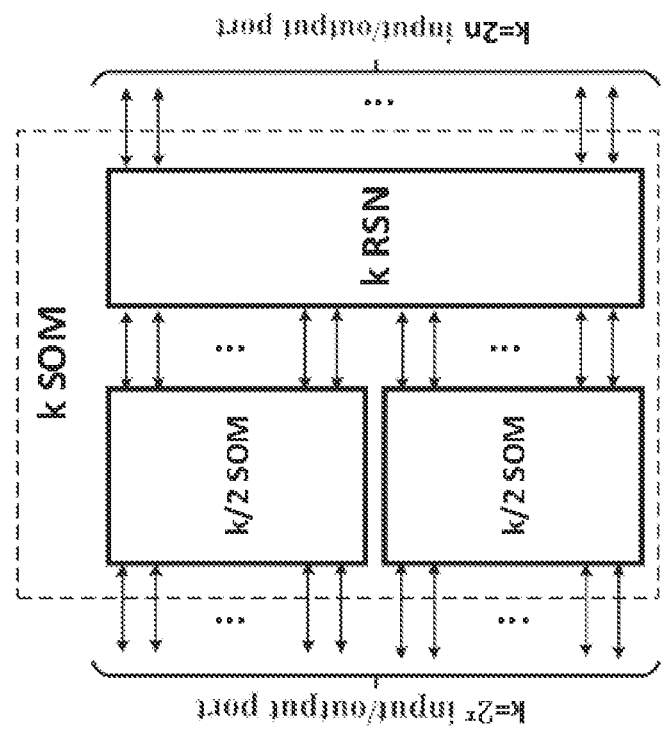
FIG. 9 (a) is a schematic diagram of topology of a SOM transport network provided in one embodiment of the present disclosure.
Figure 9B:
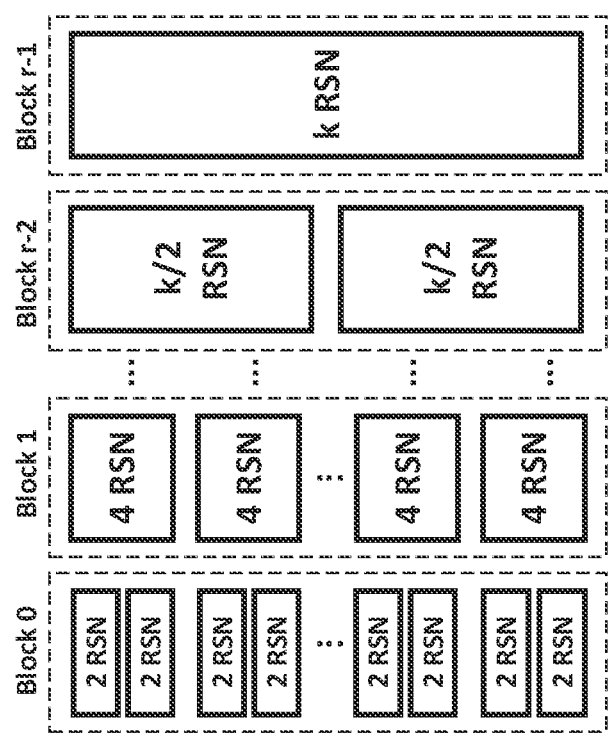

With this embodiment, the SOM transport network may be built up recursively based on RSNs. As shown in FIG. 9 (a), a k=$2^r$ scale SOM transport network may be constructed by constructing two parallel k/2 scale SOM transport networks and adding a k scale RSN network at its back end. Expanding this recursive pattern, it can be seen that the SOM network is actually composed of cascaded RSN networks of scales of (2, 4, r-1).

In this solution, all the RSN networks in each recursive level are treated as a whole functional block, called Block. As shown in FIG. 9 (b), the first layer of RSN networks (i.e., Block 0) includes k/2 parallel 2-scale RSN networks, the second layer of RSN networks (i.e., Block 1) includes k/4 parallel 4-scale RSN networks, and so on. Thus, for a SOM network of scale k=$2^r$, it can be divided into r Blocks (Block 0, Block 1, . . . , Block r-1) in total. For any Block-i, it contains $2^{r-i-1}$ parallel $2^{i+1}$-scale RSN networks which are independent of each other.

Figure 10:
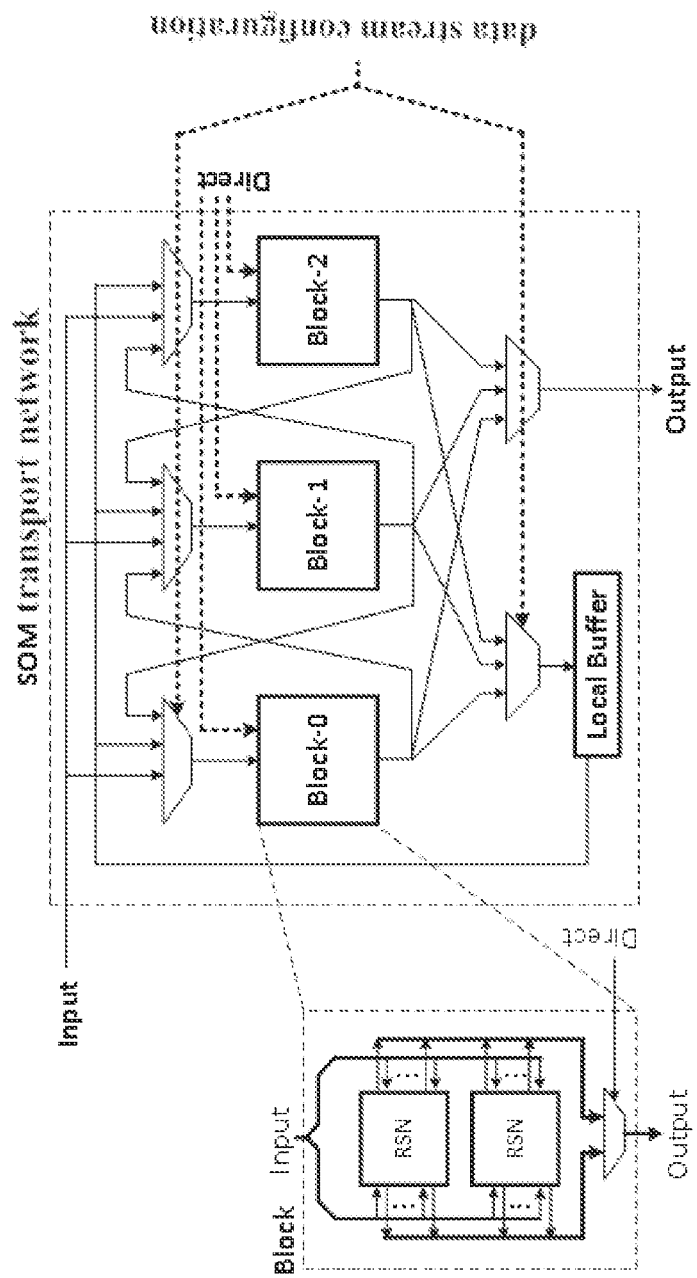
FIG. 10 is a Block structure and data stream configuration diagram of a SOM transport network provided in one embodiment of the present disclosure.

The internal structure of each Block is shown in FIG. 10, each Block has a unique input port and a unique output port, and the direction of transmission of data in the RSN network is configured via a Direct signal. The flow of data between multiple Blocks is flexibly configurable, by providing a series of selectors to accomplish the following functions: (1) an input signal of a SOM network can be selectively input to an input port of any Block, and an output signal can be selectively output from an output port of any Block; (2) the output signal of each Block is broadcast simultaneously to its forward and backward Blocks; (3) the output signals of all the Blocks are broadcast to the Local Buffer, and the output port of the Local Buffer is broadcast to all the Blocks; (4) a selector is set up before the input port of each Block to select the source of the signal; and (5) the flow direction of the data stream at each selector is set by a data stream configuration signal. FIG. 10 shows a practical case of the mechanism described above. It can be seen that based on this mechanism, the flow order of the data stream between the plurality of Blocks can be flexibly adjusted and all achieve a non-blocking pipeline. In conjunction with the Direct signal, the direction of propagation of the data stream inside each Block can be further controlled, thereby enabling a highly flexible data stream configuration.

It is further noted that the SOM transport network does not involve reduction function, so the binary switching unit components used in the base network are all basic switching units.

In another embodiment, the SOM transport network or the SOM reduction network respectively provides independent configuration signals for each Block.

For this embodiment, a SOM transport network of scale k=$2^r$ contains r Blocks (Block 0, Block 1, Block r-1). For any Block-i, it contains $2^{r-i-1}$ parallel $2^{i+1}$-scale RSN networks which are independent of each other, and each RSN network contains i+1 stages of switching units ($S_0$, $S_1$, ..., $S_i$), each stage of switching units containing $2^i$ switching units for a total of (i+1) $2^i$ switching units. The SOM network provides independent configuration signals for each Block separately. For the Block-i, the required control signals are shown in Table 2.

TABLE 2

| Signal | Direction | Bit width (bit) | Configuration Method |
|---|---|---|---|
| Direct | Input | 1 | Direct signal is shared by all the RSN networks within the Block |
| Mod | Input | If i > 0: $2^{r-i-1}$ * 2 * 3 = $2^{r-i}$ * 3<br>If i = 0: $2^{r-1}$ * 3 | Two sets of Mod signals are configured for each RSN network in the Block: The first set of signals is used for configuring a first stage of switching units (S0) of the RSN network, the Mod signals being shared by all the switching units in the stage; and the second set of signals is used to configure the remaining stage switching units (S1-Si) of the RSN network, and all the switching units in these stages share the Mod signals. Note that Block 0 contains only one stage of switching units, so only one set of Mod signals is needed |
| CW_en | Input | If i > 0: $2^{r-i-1}$ * 2 * 1 = $2^{r-i}$<br>If i = 0: $2^{r-1}$ | Two sets of CW_en signals are configured for each RSN network in the Block: The first set of signals is used for configuring first stage switching units (S0) of the RSN network, the CW_en signals being shared by all the switching units in the stage; The second set of signals is used to configure the switching units (S1-Si) of the remaining stages of the RSN network, and all the switching units in these stages share the CW_en signals. Note that the Block 0 contains only one stage of switching units, so only one set of CW_en signals is needed |
| CW_in | Input | (i + 1) $2^i$ * 2 = (i + 1) $2^i$ + 1 | Configure a CW_in signal for each switching unit in the Block |
| CW_out | Output | (i + 1) $2^i$ * 2 = (i + 1) $2^i$ + 1 | Output the routing signal for each switching unit in the Block |

In another embodiment, the SOM transport network or the SOM reduction network further configures the data stream direction between Blocks by configuring a selector at the input port of each Block.

With this embodiment, in addition to the configuration signal of each Block, the OM network also needs to configure the data stream direction between Blocks. As can be seen from FIG. 10, for a SOM network of scale k=$2^r$, the input port of each Block needs to be configured with a selector for selecting to use the input signal, the output signal of the forward Block, the output signal of the backward Block, and the output signal of the Local Buffer, for a total of r such selectors, with r−2 4-of-1 selectors, and 2 3-of-1 selectors (for the first and last Blocks). Both the Local Buffer and the output port need to be configured with selectors for selecting between the output signals of individual Blocks, there are a total of 2 such selectors. The configuration signals for these selectors are shown in Table 3.

TABLE 3

| Signal | Direction | Bit width (bit) | Quantity | Function |
|---|---|---|---|---|
| Flow_Cfg_Bin | Input | 4 | r-2 | Configure input signal selectors for Block 1-Block r-2:<br>0001: Select an input signal for the SOM network |

TABLE 3-continued

| Signal | Direction | Bit width (bit) | Quantity | Function |
|---|---|---|---|---|
| | | | | 0010: Select an output signal of a Local Buffer<br>0100: Select an output signal of a forward Block<br>1000: Select an output signal of a backward Block |
| Flow_Cfg_Bin_Edge | Input | 3 | 2 | Select input signal selectors for Block 0 and Block r-1:<br>001: Select an input signal of a SOM network<br>010: Select an output signal of a Local Buffer<br>100: Select the output signal of the forward (backward) Block |
| Flow_Cfg_Out | Input | r | 2 | Select the signal source of the input port of the Local Buffer and the output port of the SOM network, use one-hot encoding, selects the output signal of the Block corresponding to the position encoded as 1 by the selector. |

Figure 11:
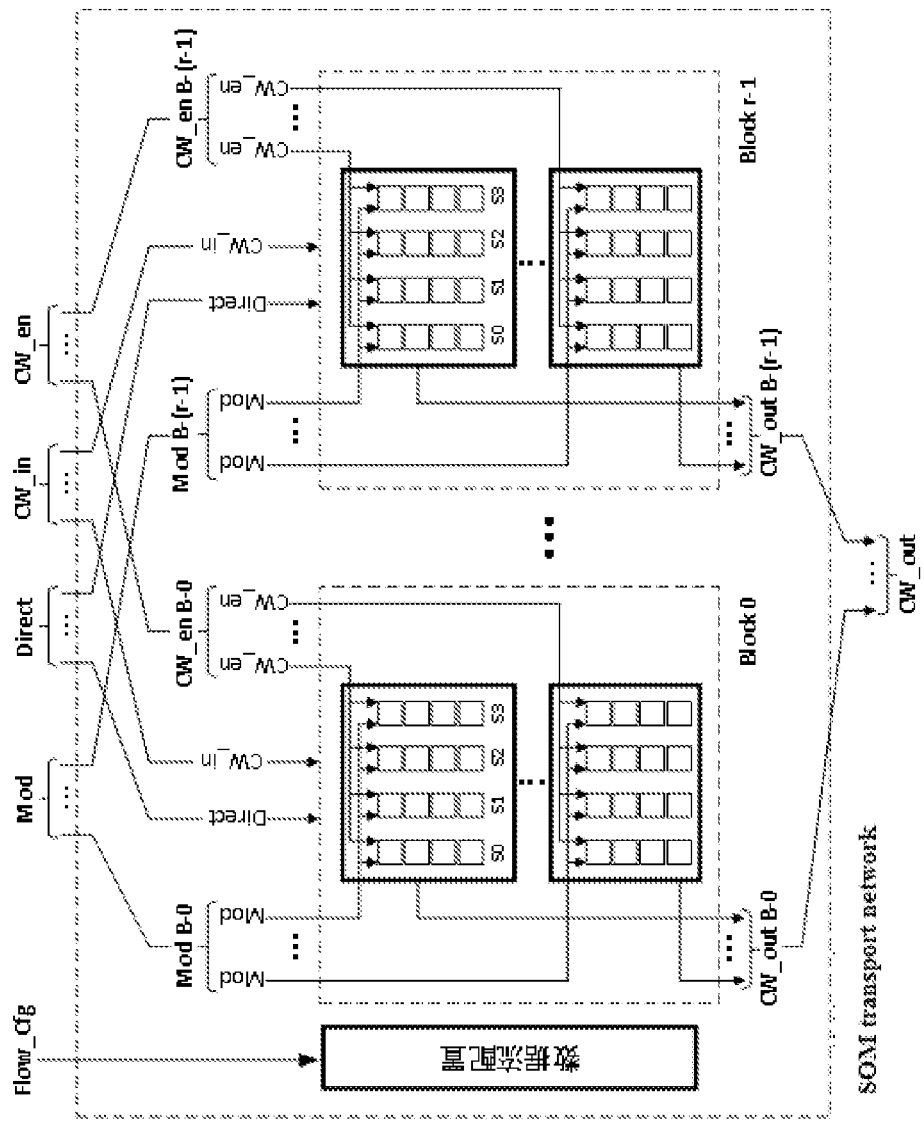
FIG. 11 is a control signal diagram of a SOM transport network provided in one embodiment of the present disclosure.

FIG. 11 illustrates all configuration signals required by a SOM network. It can be seen that each Block has an independent complete configuration signal. The Flow_Cfg signal is then used to configure the data flow selector between Blocks. The routing of all binary switching units per clock cycle is aggregated and output by the entire SOM network over the CW_out interface.

In another embodiment, a specific implementation of an 8-input SOM transport network is shown.

Figure 12:
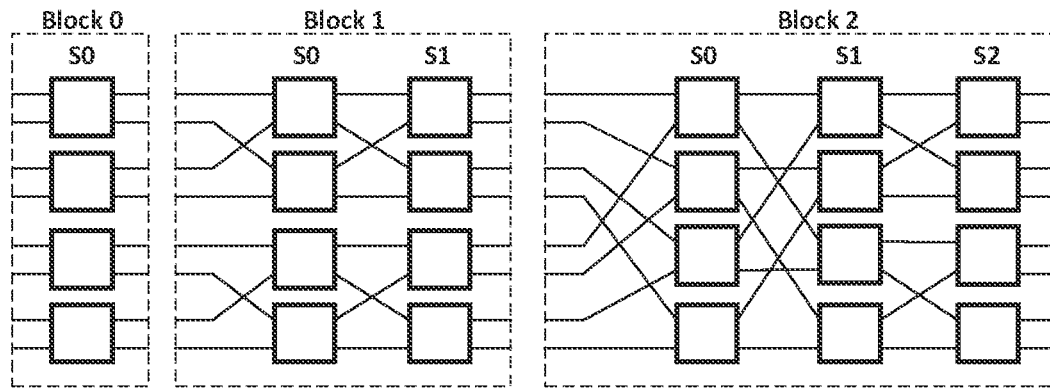
FIG. 12 is a topology diagram of an 8-input SOM transport network and a reduction network provided in one embodiment of the present disclosure.
Figure 13A:
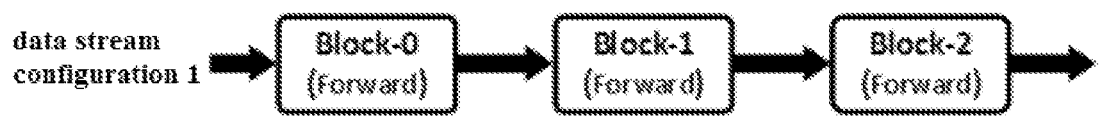
FIGS. 13 (a) to 13 (d) are diagrams illustrating several possible data stream configurations of the 8-input SOM transport network provided in an embodiment of the present disclosure.
Figure 13B:
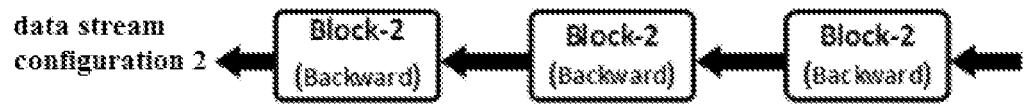
Figure 13C:
Figure 13D:
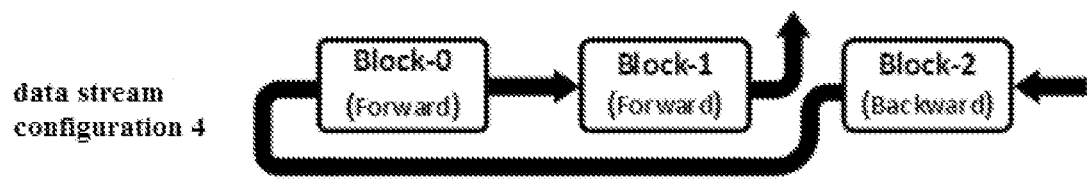

FIG. 12 illustrates a specific topology of an 8-input SOM transport network. The 8-input network contains 3 Blocks, the Block 0 contains 4 2-input RSN networks and a 1-stage switching unit ($S_0$); the Block 1 contains 2 4-input RSN networks and 2-stage binary switching units ($S_0$, $S_1$); the Block 3 contains 1 8-input RSN network and 3-stage binary switching units ($S_0$, $S_1$, $S_2$). All binary switching units in a SOM transmission network are the basic switching units of a bidirectional path.

By flexibly configuring the direction of transmission of each Block, as well as the direction of data stream between Blocks, a number of different data reorganization functions can be implemented on the input signal. FIGS. 13 (a) to 13 (d) list several possible data stream configurations.

In another embodiment, numerical sorting is shown.

Figure 14:
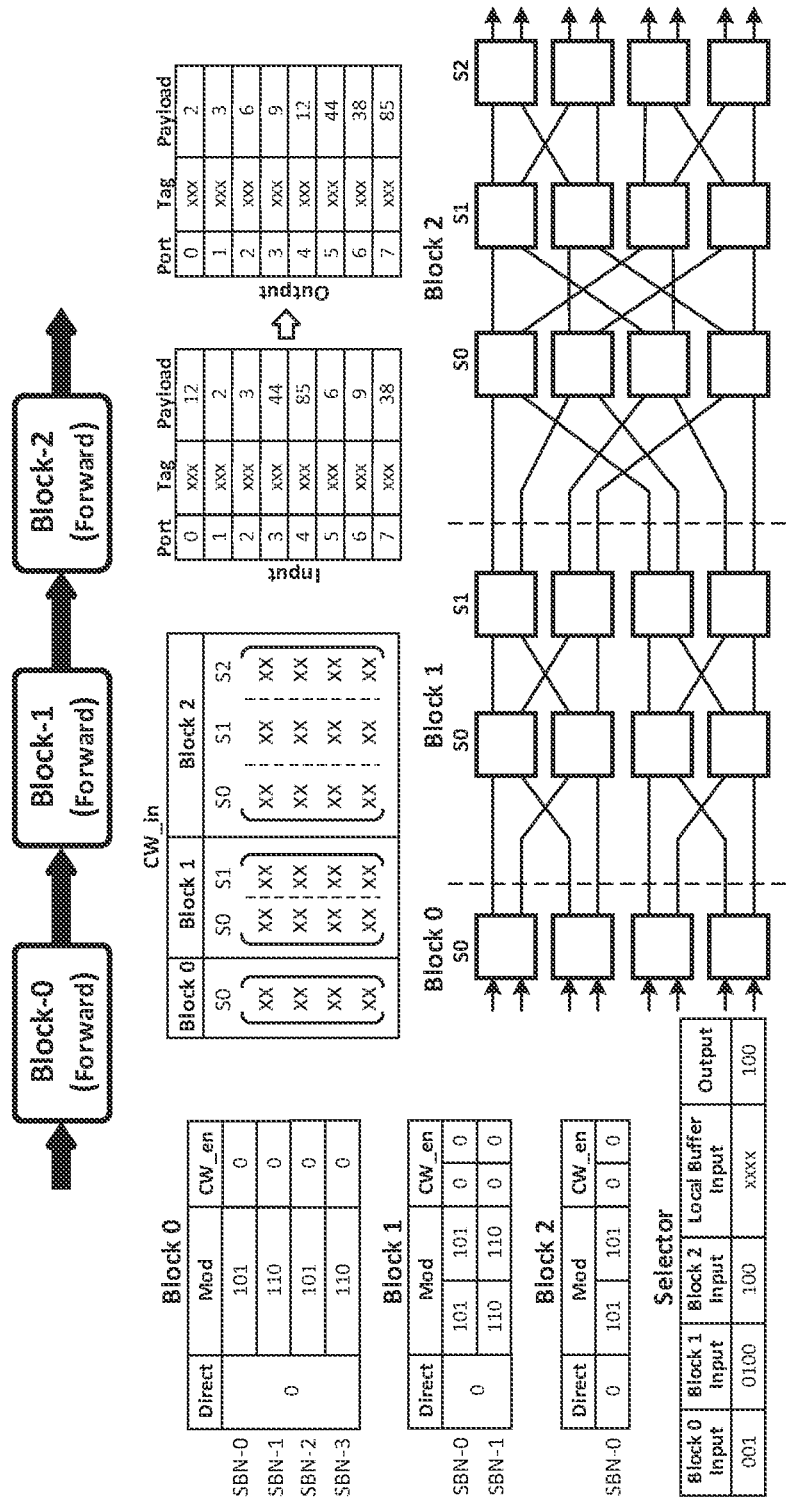
FIG. 14 is a numeric sorting and control signal configuration diagram of a SOM transport network provided in one embodiment of the present disclosure.

FIG. 14 illustrates the use of an 8-input SOM network to accomplish numerical sorting of input data and the required control signal configuration method. In this embodiment, the input signal contains only the data payload and the tag bits are not used. The SOM sorts all input data and ascends according to numerical size at the output port. The data stream goes through the SOM network in order of Block 0-1-2. The propagation direction of each Block is forward. All binary switching units of the SOM network are arranged in a self-routing mode of operation, compare the data payload of the input signal, and route based on the comparison. The externally input routing signal CW_in is not used. Based on the same principle, the present embodiment can be slightly modified to achieve numerical descending sorting of all the input data.

In another embodiment, numerical resorting is shown.

Figure 15:
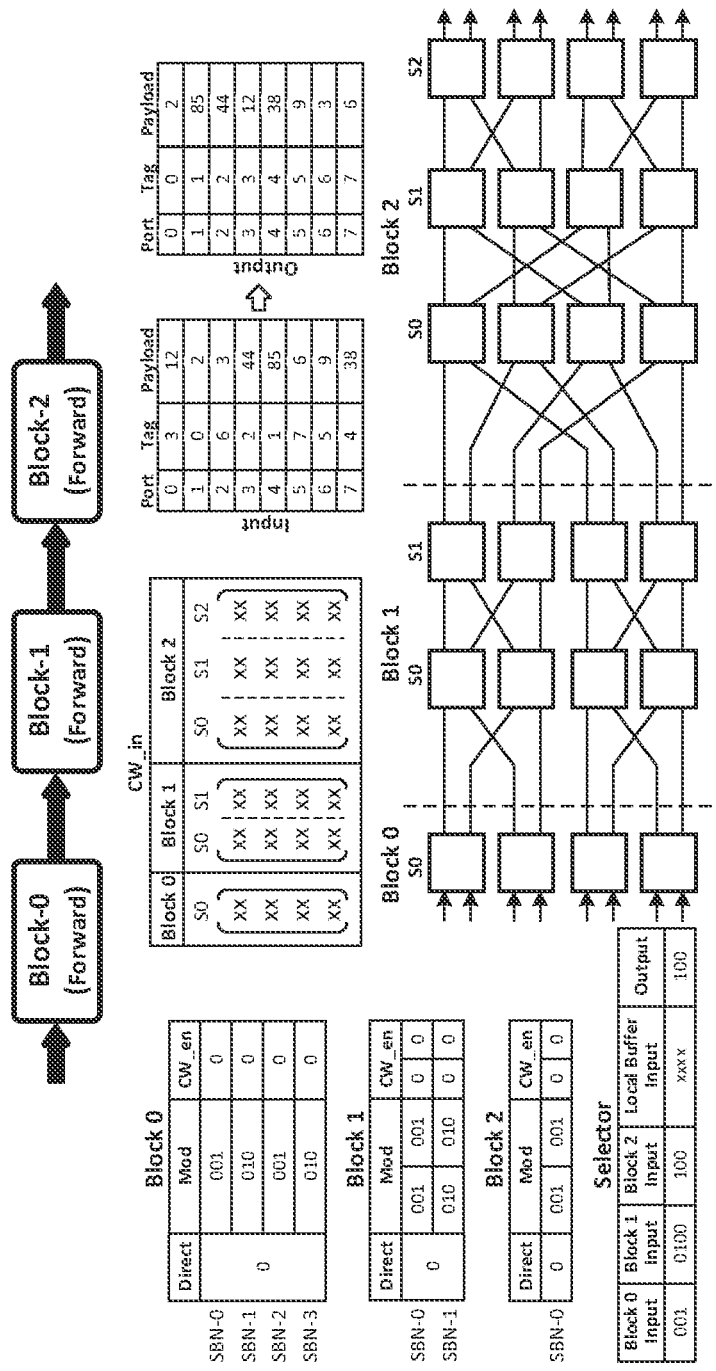
FIG. 15 is a numeric rearrangement and control signal configuration diagram of the SOM transport network provided in one embodiment of the present disclosure.

FIG. 15 illustrates the use of an 8-input SOM network to accomplish numerical resorting of input data and the required control signal configuration method. In this embodiment, the tag of each input signal is set to its desired resorted position. The SOM network sorts the tags so that each data is sent to a designated output port, enabling resorting of the input signals in any order. In this embodiment, the data stream goes through the SOM network in order of Block 0-1-2. The propagation direction of each Block is forward. All binary switching units of the SOM network are set in a self-routing mode of operation, compare the tags of the input signals, and route based on the comparison results. The externally input routing signal CW_in is not used.

In another embodiment, numerical multicasting is shown.

Figure 16:
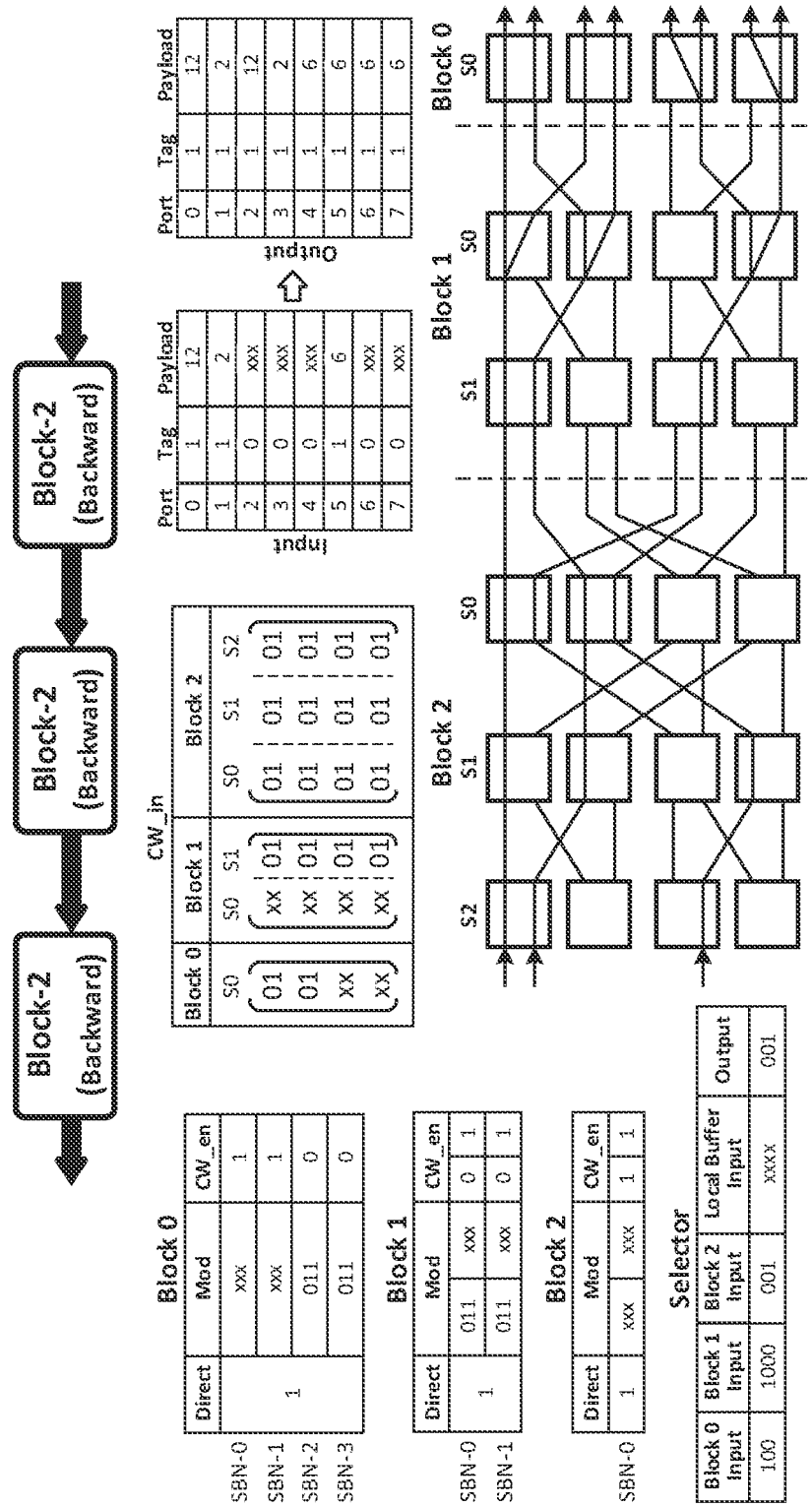
FIG. 16 is a numerically multicast and control signal configuration diagram of the SOM transport network provided in one embodiment of the present disclosure.

FIG. 16 illustrates the use of an 8-input SOM network to accomplish numerical multicasting of input data and the required control signal configuration method. In this embodiment, the tag of the input signal that needs to be multicast is set to 1, and the tags of the rest of the input signals are set to 0. The SOM network may multicast a designated signal within a designated range of output ports according to the configuration information. In this example, data for input ports 0 and 1 is multicast onto output ports 0-3, and data for an input port 5 is multicast onto output ports 4-7. The data stream goes through the SOM network in the order of Block 2-1-0. The propagation direction of each Block is reversed. Of these, most of the binary switching units are routed "through" using the CW_in signal. Only the switching unit at the S0 level of Block 1 and the switching units of RSN 0 and RSN 1 of Block 0 are configured in a self-routing mode, multicasting (either upcasting or downcasting) is performed according to the tag size, thereby copying and propagating data with tag 1. By modifying and configuring the routing modes and CW_in configurations of individual Blocks, input signals in different locations can be multicast onto output ports of different sizes.

In another embodiment, compression and decompression of non-zero numerical values is displayed.

Figure 17A:
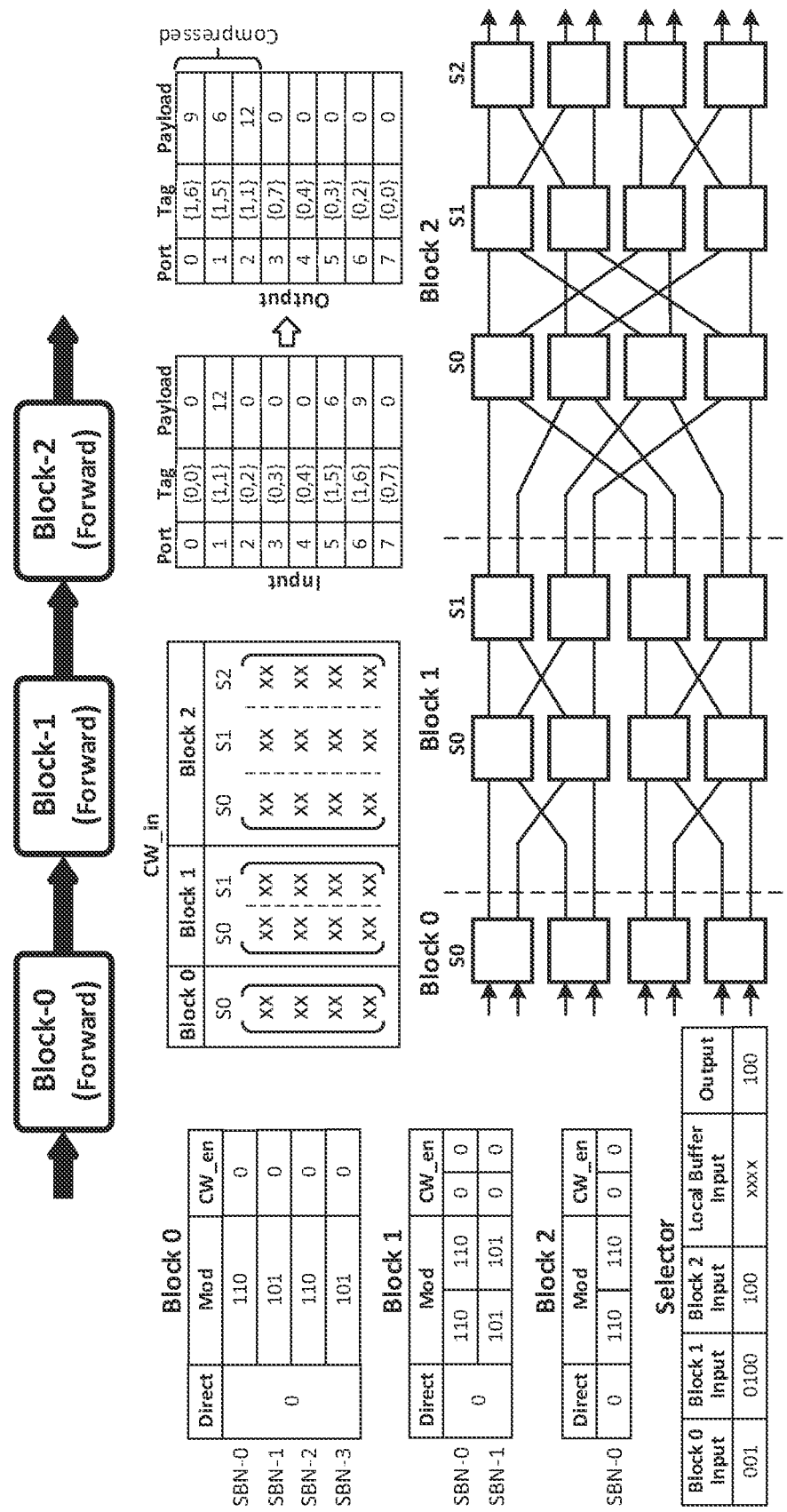
FIG. 17 (a) is a non-zero numeric compression and control signal configuration diagram of the SOM transport network provided in one embodiment of the present disclosure.
Figure 17B:
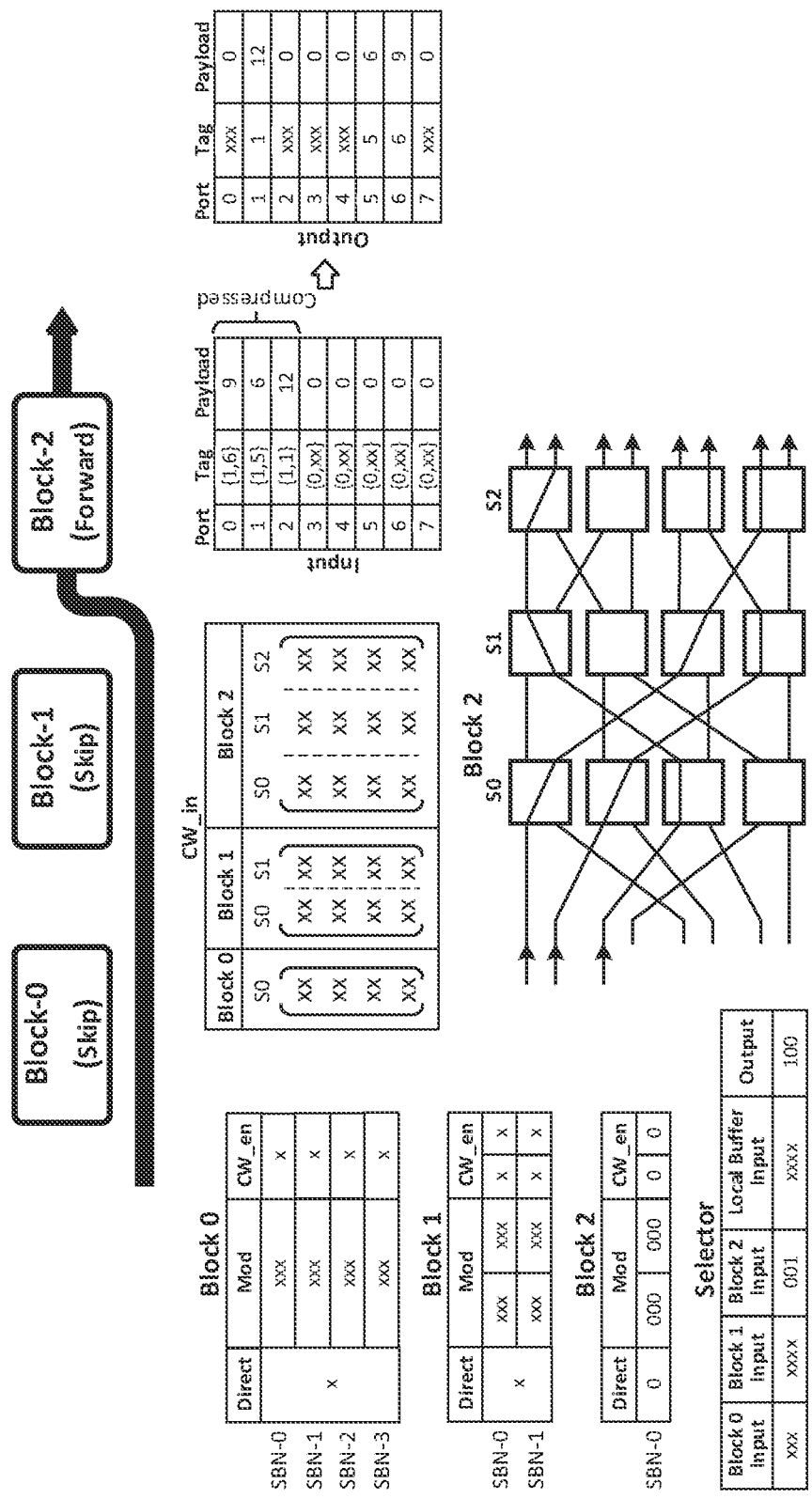

FIG. 17 (a) and FIG. 17 (b) illustrate the use of an 8-input SOM network to accomplish compression and decompression of non-zero data and the required control signal configuration method.

In an embodiment of non-zero numeric compression, the upper bit of the tag of each non-zero input data is set to 0 and the lower bit is set to the position of that element in the vector. The tag upper bits of the remaining input data are set to 1. The SOM network sorts the tags in an ascending order, thereby rearranging the non-zero elements to the front of the output port, and the relative order of the respective non-zero elements to each other remains unchanged. The data stream goes through the SOM network in order of Block 0-1-2. The propagation direction of each Block is forward. All binary switching units of the SOM network are set in a self-routing mode of operation, the tags of the input signals are compared, and routing is based on the comparison results. The externally input routing signal CW_in is not used.

In embodiments of non-zero numerical value decompression, the tag of each non-zero numerical value is set to its position in the original vector.

In another embodiment, post-multicast packet resorting is shown.

Figure 18:
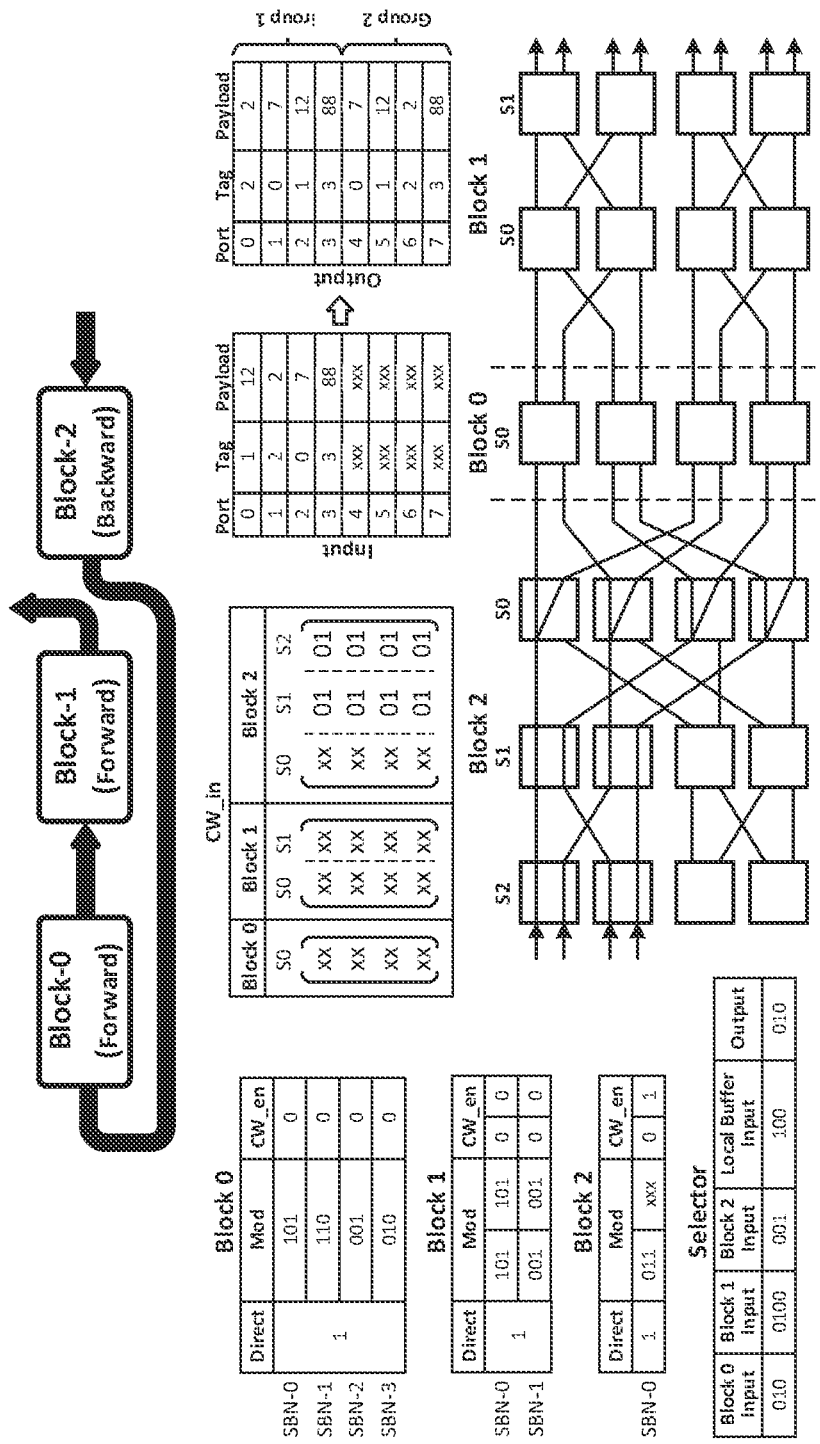
FIG. 18 is a post-multicast packet reordering and control signal configuration diagram of the SOM transport network provided in one embodiment of the present disclosure.

FIG. 18 illustrates the use of an 8-input SOM network to accomplish multicast and packet ordering and the required control signal configuration method. In this embodiment, 4 input data carrying tags are first multicast by Block 2 into 2 groups and then rearranged within each group, wherein the first group is sorted in an ascending order of numerical size and the second group is sorted by tag, thereby enabling the intra-group elements to be reorganized. The data stream goes through the SOM network in the order of Block 2-0-1. The direction of Block 2 is a backward direction and the directions of Block 0 and 1 are forward.

In another embodiment, synchronization of multiple SOM networks is shown.

Figure 19:
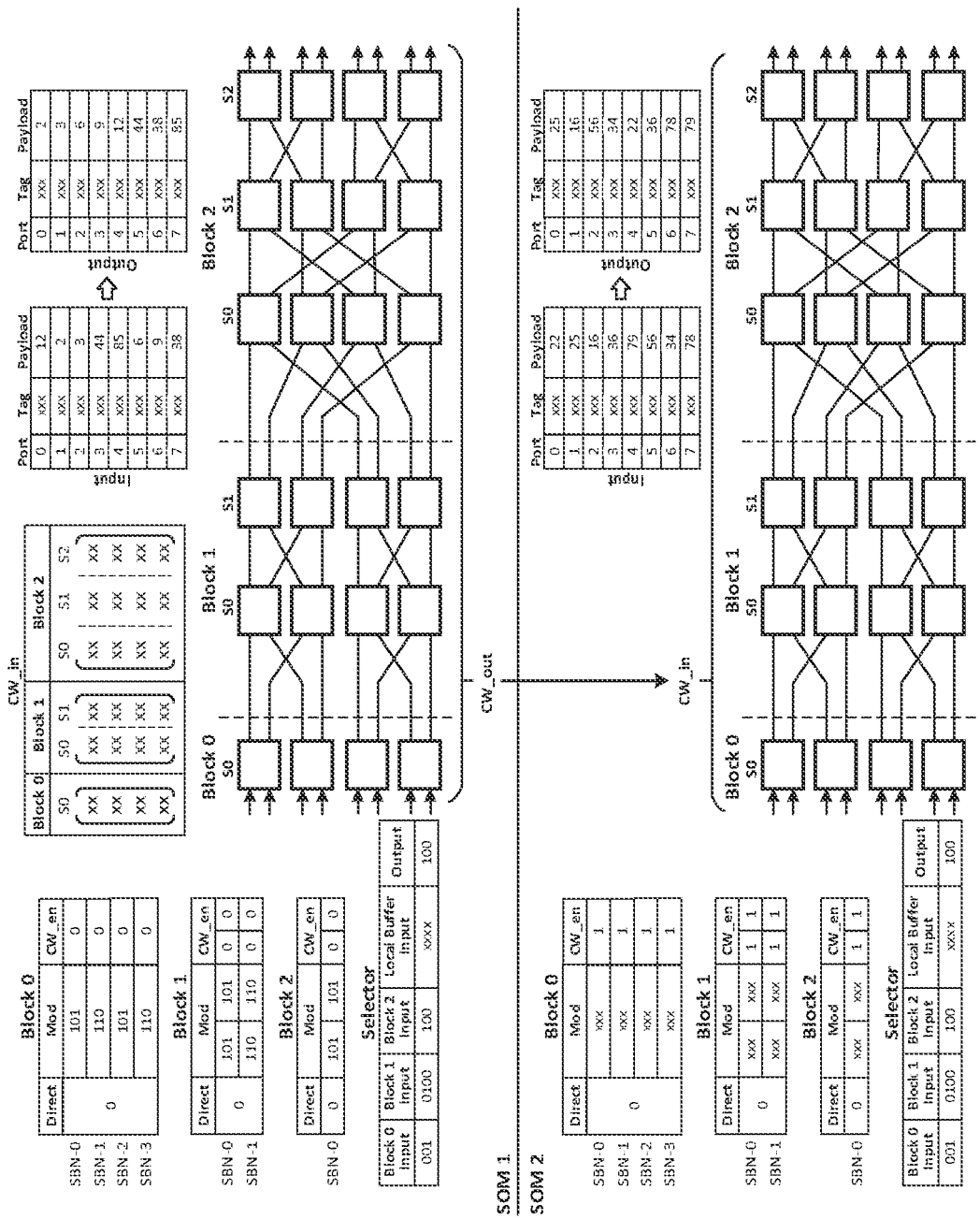
FIG. 19 is a synchronization and control signal configuration diagram for multiple SOM transport networks provided in one embodiment of the present disclosure.
Figure 20:
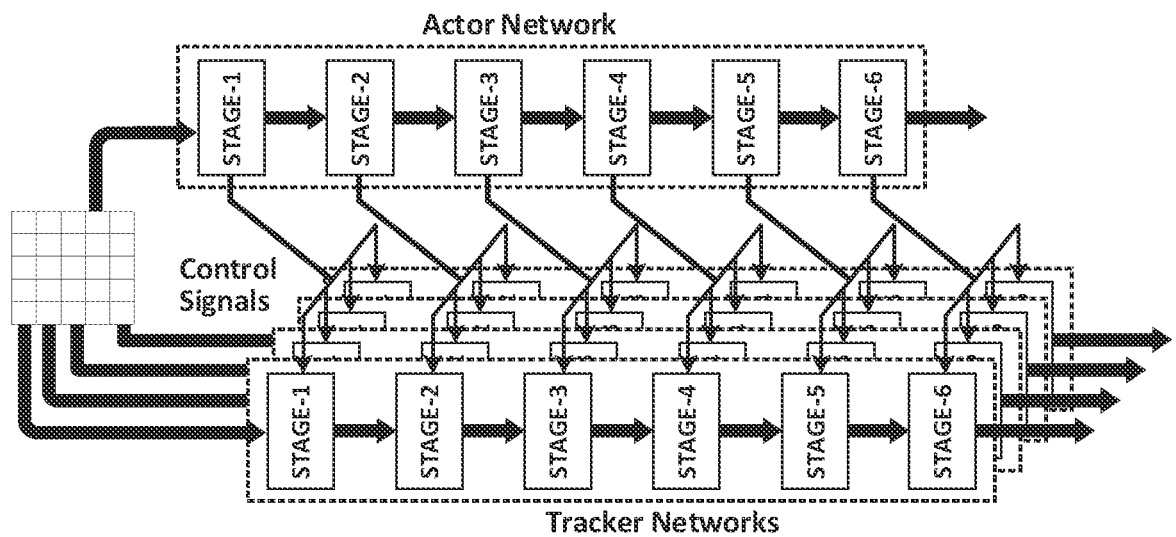
FIG. 20 is a schematic diagram illustrating synchronization of an Actor Network with multiple Tracker Networks provided in one embodiment of the present disclosure.

By sharing the routing signals, multiple SOM networks may simultaneously complete the same data reorganization. FIG. 19 illustrates that two SOM networks (SOM 1 and SOM 2) synchronously complete data reorganization. The SOM 1 sorts the data payload of the 8 input signals in an ascending order. At the same time, the SOM 1 shares the routing information of each binary switching unit to the SOM 2 through the CW_out port. The SOM 2 directly uses the routing information outputted by the SOM 1 to configure its local binary switching units so that the input signals of the SOM 2 go through the same resorting as the input signals of the SOM 1. Therefore, elements in the output signals of SOM 1 and SOM 2 that are co-located still retain their correspondence in the original input vector.

In such a synchronization relationship, the SOM network that provides the routing information is referred to as the Actor Network, and the SOM network that receives the routing information is referred to as the Tracker Network. Since the transmission of Actor Network's routing signals to the Tracker Network requires a one clock cycle delay, the Actor Network's data stream is always one clock cycle earlier than the Tracker Network's data stream. It is further noted that one Actor Network may correspond to multiple Tracker Networks simultaneously. An example of a matrix change is given in FIG. 20. In this example. Elements of a certain column of the matrix are sorted by the Actor Network while elements of the remaining columns are processed by 4 Tracker Networks so that the relative positions between elements of the columns remain unchanged.

In another embodiment, on the basis of the SOM transport network, for each Block, the SOM reduction network may be constructed by replacing the first switching unit of the first stage of each RSN network contained therein with a reduction switching unit.

Figure 21:
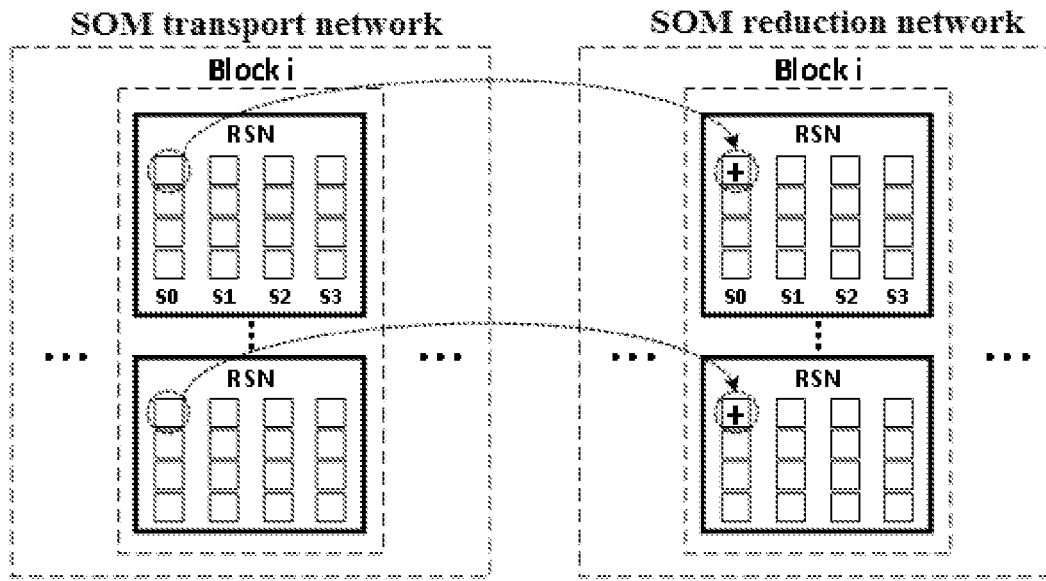
FIG. 21 is a construction diagram of a SOM reduction network provided in one embodiment of the present disclosure.

With respect to this embodiment, based on the SOM transport network, a SOM reduction network may be further constructed. It is constructed by replacing, for each Block on the basis of the SOM transport network, the first switching unit of the first stage of each RSN network contained therein with a reduction switching unit. This is shown in FIG. 21.

Figure 22A:
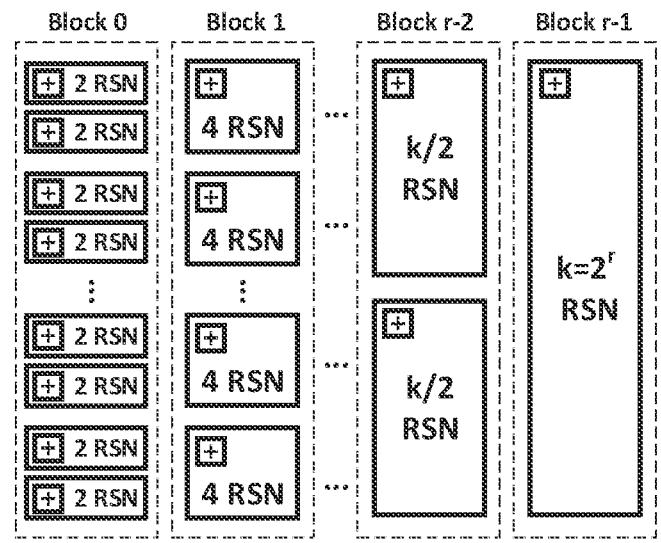
FIG. 22 (a) is a schematic diagram of the locations of various reduction switching units in the SOM reduction network provided in one embodiment of the present disclosure.
Figure 22B:
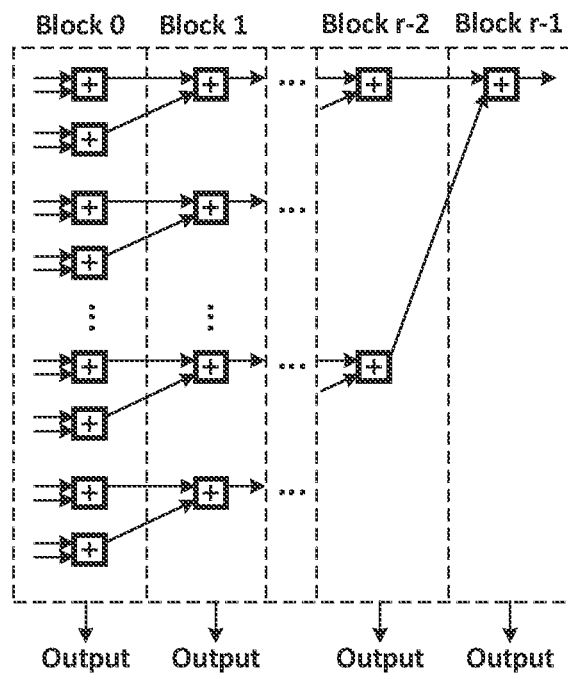

In another embodiment, the SOM reduction network is a SOM network with an input size of k having k−1 adders embedded therein, and the position of each adder is shown in FIG. 22 (a).

For this embodiment, as shown in FIG. 22 (b). The structure actually embeds a complete k-input adder tree with k−1 adders in the SOM network. By controlling the data stream of the SOM network, the data stream may be controlled to be output at an output port of any Block, thereby supporting the output of the summed result at any level of the adder tree. Based on this mechanism, the SOM reduction network may enable flexible reduction operations on different scale data. In theory, k can take any power of 2, i.e., $k=2^r$, and r is any positive integer greater than 1. In a practical application scenario, k typically ranges between 4 and 512.

The SOM reduction network may enable packet reduction at different scales by adjusting the data stream order between Blocks. Specifically, for a randomly distributed set of input signals, the SOM network may aggregate elements that are divided into different groups and distributed at random locations by group, then perform reduction calculations for each group separately, and output the calculation results for each group at a specified location. In this "aggregation-reduction" computing mode, the "aggregation" function is achieved by reverse use of RSN and the "reduction" is achieved by forward use of adder trees embedded in the SOM network. By adjusting the RSN scale used for "aggregation" and "reduction", group reduction at different scales can be achieved.

In another embodiment, a concrete implementation of an 8-input SOM reduction network is shown.

Figure 23:
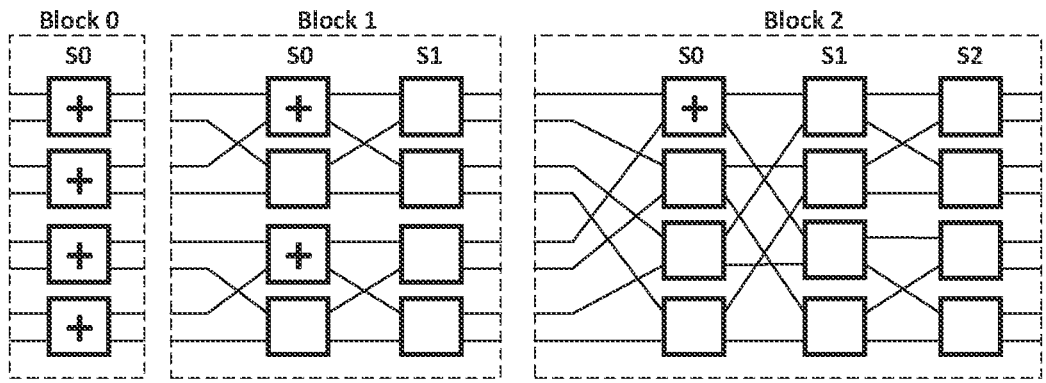
FIG. 23 is a topology diagram of an 8-input SOM reduction network provided in one embodiment of the present disclosure.

FIG. 23 illustrates a specific topology of an 8-input SOM reduction network. The 8-input network contains 3 Blocks, the Block 0 contains 4 2-input RSN networks and a 1-stage binary switching unit ($S_0$); the Block 1 contains 2 4-input RSN networks and 2-stage binary switching units ($S_0$, $S_1$); the Block 3 contains 1 8-input RSN network and 3-stage binary switching units ($S_0$, $S_1$, $S_2$). The first switching unit of the S0 stage of each RSN network uses reduction switching units and the remaining switching units use basic switching units.

In another embodiment, a group reduction of scale 4 is shown.

Figure 24:
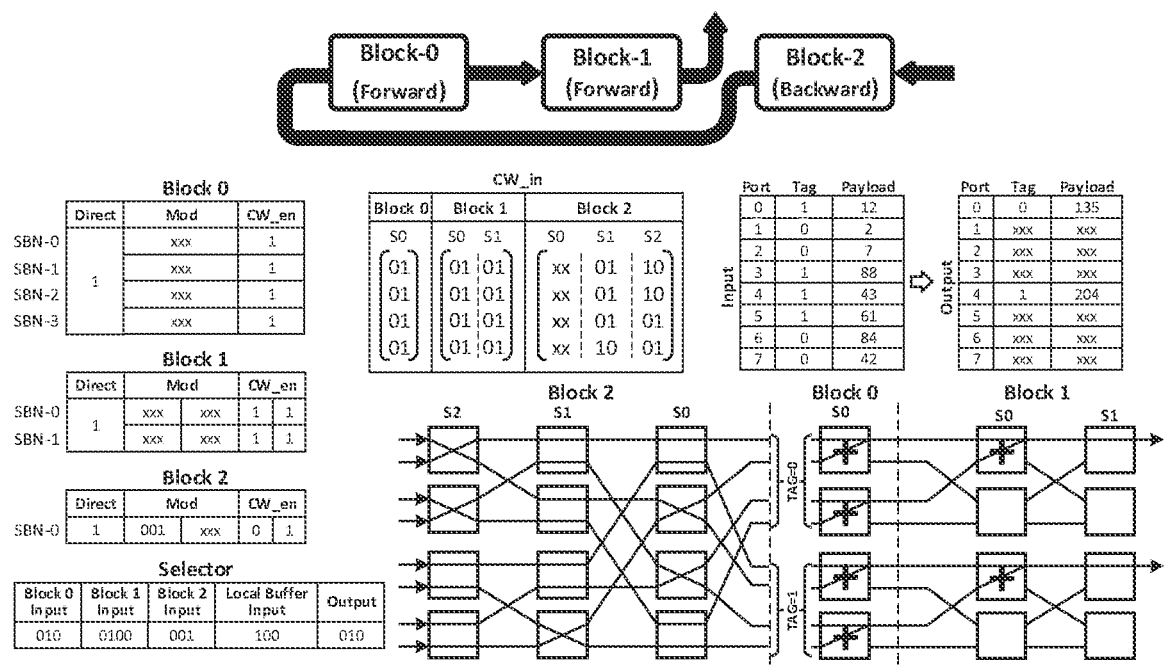
FIG. 24 is a block reduction and control signal configuration diagram for the SOM reduction network on a 4 scale provided in one embodiment of the present disclosure.

FIG. 24 illustrates the use of an 8-input SOM network to accomplish reduction of packet data on a scale of 4 and the required control signal configuration method. In this embodiment, each input data is labeled with its group number, the 8 input data are divided into two groups (group 0 and group 1) with 4 elements in each group, and the individual elements in each group are randomly distributed in the input vector. The SOM network first clusters two groups of elements by setting the Block 2, and then adds groups by the reduction switching units of Block 0 and Block 1. The summed result of Group 0 and Group 1 is eventually output by Block 1. In this embodiment, the Reduce signals in Block 0 and Block 1 are set to 1, and the Reduce signal in Block 2 is set to 0. The data stream goes through the SOM network in the order of Block 2-0-1. The direction of Block 2 is backward and the directions of Block 0 and 1 are forward.

In another embodiment, a group reduction of scale 2 is shown.

Figure 25:
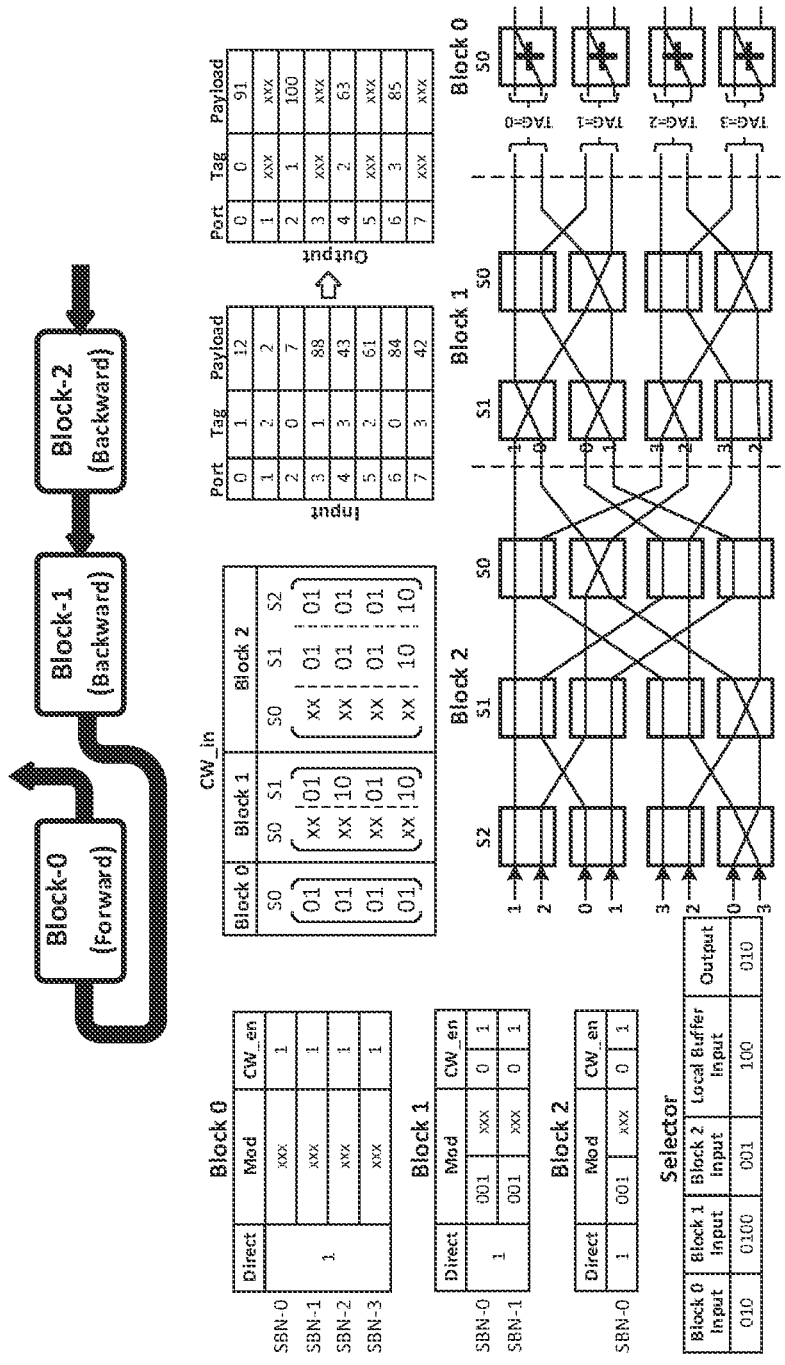
FIG. 25 is a block reduction and control signal configuration diagram for the SOM reduction network on a 2 scale according to one embodiment of the present disclosure.

FIG. 25 illustrates the reduction of 2-scale packet data using an 8-input SOM network and the required control signal configuration method. In this embodiment, each input data is labeled with its group number, the 8 input data are divided into 4 groups (group 0, group 1, group 2, group 3) with 2 elements in each group, and the individual elements in each group are randomly distributed in the input vector. The SOM network first clusters 4 groups of elements by setting Block 2 and Block 1, followed by group summation by Block 0 and reduction switching units. The summed result of each group is finally output by Block 0. In this embodiment, the Reduce signal in Block 0 is set to 1, and the Reduce signals in Block 1 and Block 2 are set to 0. The data stream goes through the SOM network in the order of Block 2-1-0. The direction of Block 2 and Block 1 is backward and the direction of Block 0 is forward.

In another embodiment, the solution is extremely scalable and is mainly embodied in the following points:

(1) The SOM network is recursive setup and its scale can be arbitrarily extended to $2^r$ size.

(2) The configuration signals and routing methods of each binary switching unit in a SOM network may be extended to enable more complex routing methods. For example, the bit width of the tag can be expanded and compressed according to requirements. It is also possible to provide that each switching unit decides its routing method based on the value of a bit in the input signal label, thereby supporting each input data to save its complete routing path in the label bit without requiring each binary switching unit to route based on the comparator result.

(3) The data stream of the SOM network may be further flexibilized. By implementing a flexible data path configuration between stages of switch units similar to that between Blocks, the data stream may be allowed to pass through the Block instead of in a fixed direction, both "forward" and "backward", but rather the order of passing through the various binary switch unit stages in the Block may be selected more flexibly. With this extension, more topology types can be implemented, thus supporting more complex data rearrangement function.

(4) Reduction function of the SOM network may be further extended. The reduction function of the reduction switching unit can be extended to other operations than addition, such as multiplication, shift, max/min, or AND, OR, NOT, etc. logical operations.

In another embodiment, the present solution is applied broadly, mainly in terms of the following:

(1) The SOM network can be used to transfer data between a Cache and registers in a general SIMD computing architecture. The data during transfer from the Cache to the registers, through the data reorganization function provided by the SOM network, can better adapt to the data format required by SIMD instructions, thus reducing the number of SIMD instructions required for computation. Moreover, the results of the computations are written back from the registers to the Cache, and through the data reassembly and flexible reduction functions provided by the SOM network, flexible post-processing is allowed, such as group summation or non-zero element compression of the results of the computations. The post-processing is done in data transfer, so the SIMD instruction number can be further reduced.

(2) The SOM network may be used for data pre- and post-processing modules of a dedicated Domain-Specific Architecture (DSA). Depending on the data stream needed for specialized computations, a SOM network may be specially adapted and adapted to remove certain unwanted functions and simplify its circuit complexity while better adapting to certain types of specialized data structures.

(3) The SOM network may be used for visit pre- and post-processing of bulk data storage media such as DDR. Due to the high scalability of the SOM, its scale can be scaled to comply with data transfer processing in large blocks. For example, the dynamic compression and decompression functions of the SOM may effectively reduce storage access bandwidth and improve access efficiency.

Although embodiments of the present disclosure have been described above with reference to the accompanying drawings, the disclosure is not limited to the specific embodiments and fields of application described above, which are merely illustrative, instructive, and not restrictive. Those of ordinary skill in the art, in light of the present description and without departing from the scope of the present disclosure as claimed, can take many forms, all of which fall within the scope of the present disclosure.

What is claimed is:

1. A multifunctional data reorganization network, comprising a binary switching unit and a recursive shuffle network (RSN), wherein both the binary switching unit and the RSN enable bidirectional transmission of data, and the data reorganization network completes data reorganization by controlling the transmission direction of a signal in the network.

2. The data reorganization network according to claim 1, wherein the binary switching unit comprises a basic switching unit and a reduction switching unit.

3. The data reorganization network according to claim 1, wherein an input signal of the binary switching unit comprises a tag and a data payload, and the data payload is the data content actually needed to be transmitted and the tag is the corresponding routing information.

4. The data reorganization network according to claim 1, wherein the binary switching unit has two modes of operation: a self-routing mode and routing fulfilled by following routing information input externally, wherein the self-routing mode is that the routing method is determined according to the value of the tag or the data payload of the input signal.

5. The data reorganization network according to claim 1, the RSN is obtained by successively superimposing a smaller scale bidirectional perfect shuffle network.

6. The data reorganization network according to claim 1, a sort recorder multicast (SOM) transport network is recursively built based on the RSN, all the RSNs in each recursive level being treated as a whole functional Block.

7. The data reorganization network according to claim 6, wherein a SOM transport network or a SOM reduction network respectively provides an independent configuration signal for each Block.

8. The data reorganization network according to claim 6, wherein the SOM transport network or the SOM reduction network can further configure the data stream direction between Blocks by configuring a selector at the input port of each Block.

9. The data reorganization network according to claim 1, wherein on the basis of the SOM transport network, for each Block, a SOM reduction network is constructed by replacing the first binary switching unit of the first level of each RSN network comprised therein with a reduction switching unit.

10. The data reorganization network according to claim 9, wherein the SOM reduction network is formed by embedding a complete k-input adder tree in the SOM network, wherein the adder tree is provided with k−1 adders, and k is a positive integer power of 2.

11. The data reorganization network according to claim 9, wherein a SOM transport network or a SOM reduction network respectively provides an independent configuration signal for each Block.

12. The data reorganization network according to claim 9, wherein the SOM transport network or the SOM reduction network can further configure the data stream direction between Blocks by configuring a selector at the input port of each Block.

* * * * *